US 6,650,635 B1

(12) United States Patent
Weinstein et al.

(10) Patent No.: US 6,650,635 B1
(45) Date of Patent: **\*Nov. 18, 2003**

(54) NETWORK TELEPHONE COMMUNICATION

(75) Inventors: Lee Weinstein, Arlington, MA (US); John A. Kowalonek, Westborough, MA (US); P. Bradley Rosen, Cambridge, MA (US); Benjamin Chigier, Wellesley, MA (US); James A. Goldstein, Acton, MA (US); Ed Olkkola, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/299,207

(22) Filed: Apr. 23, 1999

Related U.S. Application Data

(63) Continuation-in-part of application No. 08/702,099, filed on Aug. 23, 1996, now abandoned.

(51) Int. Cl.[7] .............................................. H04L 12/66
(52) U.S. Cl. ...................... 370/352; 370/352; 370/389; 379/88.01; 379/88.02; 379/265.09
(58) Field of Search ................................ 379/88, 15.02, 379/142.18, 220.01, 265.09, 243, 399.01, 90.01; 375/220; 370/389, 276, 282, 351–354, 395.61, 469, 466, 467, 473, 352

(56) References Cited

U.S. PATENT DOCUMENTS

| 4,996,709 A | * | 2/1991 | Heep | 379/160 |
| 5,805,587 A | * | 9/1998 | Norris | 370/352 |
| 5,850,436 A | | 12/1998 | Rosen et al. | 379/377 |
| 5,864,607 A | * | 1/1999 | Rosen | 379/90.01 |
| 6,069,890 A | * | 5/2000 | White | 370/352 |

* cited by examiner

Primary Examiner—Douglas Olms
Assistant Examiner—Robert W. Wilson

(57) ABSTRACT

A communications system includes a telephone, a data network, a device coupled to the data network and telephone, and a communications routine in the device. The communications routine controls communication of voice data between the telephone and the data network.

7 Claims, 30 Drawing Sheets

| HW_DEVICE METHOD | CIU CONTROL COMMANDS | EXPECTED ACKNOWLEDGE MESSAGE |
|---|---|---|
| RINGPIU | PC_RINGPIU | CIU_STATUS |
| ANSWERPOTS | PC_SEIZELINE | CIU_STATUS |
| HANGUPPOTS | PC_UNSEIZELINE | CIU_STATUS |
| ANSWERHOMEWIRE | PC_HWCALLACK | CIU_STATUS |
| HANGUPHOMEWIRE | PC_DROPCIUCARRIER | CIU_STATUS |
| LISTEN | PC_SETMONITORMODE (ON) | CIU_STATUS |
| ENDLISTEN | PC_SETMONITORMODE (OFF) | CIU_STATUS |
| READRINGCOUNT | PC_GETRINGROLLOVER | CIU_RING_ROLLOVER_CURRENT |
| SETRINGCOUNT | PC_SETRINGROLLOVER | CIU_STATUS |

FIG. 18B

| ALERT/STATUS REPORTED BY CIU | NOTIFICATION FROM HW_DEVICE OBJECT TO TSP |
| --- | --- |
| CIU_STATUS (PIU_CARRIER_DETECTED) | HWRING |
| CIU-STATUS (NOT PIU_CARRIER_DETECTED) | HWCALLMISSED \| HWREMOTEDISCONNECT \| FLASHDETECT |
| CIU_STATUS (OFF-HOOK DETECTED) | POTSOFFHOOKDETECT |
| CIU_STATUS (NOT PARALLEL OFF-HOOK DETECT) | POTSONHOOKDETECT & HWREMOTEDISCONNECT |
| CIU_ALERT_INFO (RING AVAILABLE) | POTSRING (ALSO ISSUE PC_CLEAR_RING_TRIGGER) |
| CIU_ALERT_INFO (STATUS CHANGED) | NONE (ISSUE PC_GET_STATUS AND USE STATUS INFORMATION CIU_STATUS) |

FIG. 18C

NETWORK TELEPHONE COMMUNICATION

CROSS REFERENCE TO RELATED APPLICATION

This application is a continuation-in-part of U.S. Ser. No. 08/702,099, filed Aug. 23, 1996, abandoned, entitled "SIGNAL DEBOUNCING."

BACKGROUND

The invention relates to network telephone communication.

The increasing popularity of the Internet has caused an expansion of features available to users over the Internet. One such feature is the ability to communicate easily and quickly between remote points on the Internet. Traditionally, communication between remote users have occurred through electronic mail. However, with improved processing capabilities of computer systems, voice communications over the Internet can be accomplished to allow "real-time" interaction between remote users. Typically, to perform such Internet voice communications, computer systems may be fitted with sound cards, speakers, and microphones. Software applications may be loaded into such computer systems to allow point-to-point voice communications over the Internet. Voice data is transmitted back and forth between the users over the Internet according to predefined protocols, such as the H.323 protocol that defines a standard for audio, video, and data communications across Internet Protocol (IP) based networks. Other transfer protocols include the hypertext transfer protocol (HTTP) and file transfer protocol (FTP).

One limitation of such typical systems is that they require the Internet voice communication user to sit at the computer. At a site where multiple users exist, each user must go to where the computer is located to perform Internet voice communications, or alternatively, multiple computers located at various points in the site and fitted with the proper hardware and software components are needed. Thus, a need exists for an improved method and apparatus for communication across data networks.

SUMMARY

Generally, the invention is directed to voice communication over a network in which a user can use a telephone connected to a computer to perform the voice communication.

In general, in one embodiment, a communications system includes a telephone, a data network, a device coupled to the data network and the telephone, and a communications routine in the device. The communications routine controls communications of voice data between the telephone and the data network.

Other features and embodiments will become apparent from the following description and from the claims.

BRIEF DESCRIPTION OF THE DRAWINGS

FIGS. 18B and 18C are tables showing the mapping of commands between the device object of FIG. 12 and the computer interface unit firmware of FIGS. 8, 9A, and 9B.

DETAILED DESCRIPTION

In the following description, numerous details are set forth to provide an understanding of the present invention. However, it is to be understood by those skilled in the art that the present invention may be practiced without these details and that numerous variations or modifications from the described embodiments may be possible.

Figure 20:
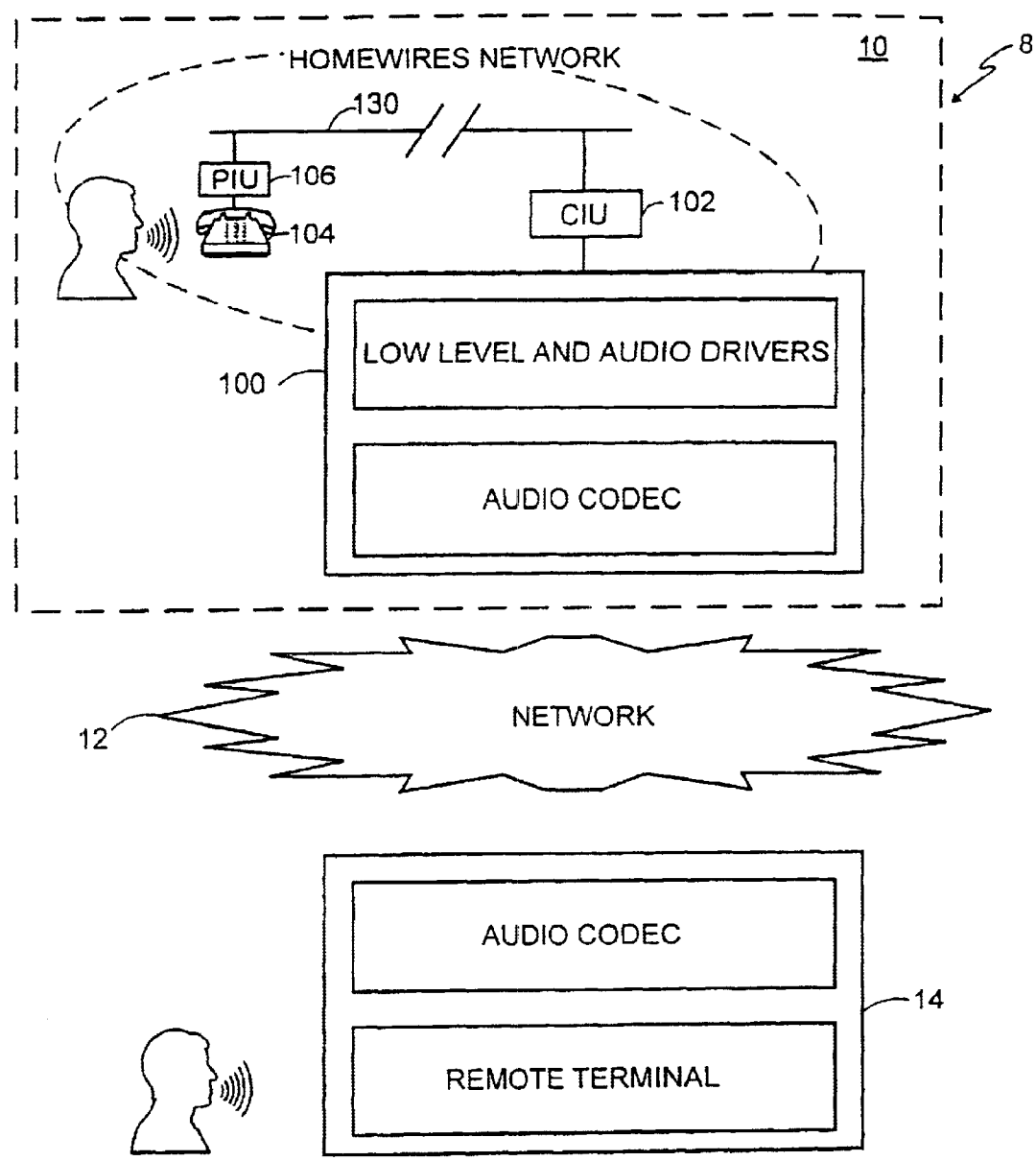
FIGS. 20 and 21 are block diagrams of layers in a system for performing network phone calls according to one embodiment.

In the exemplary network communication system 8 shown in FIG. 20, a user can place a telephone call between a telephone network system 10 over a network 12 (e.g., the Internet or other type of data network such as a local area network, wide area network, and so forth) and a remote terminal. In the telephone network system 10, the user can speak into a telephone 104 coupled over a telephone network 130 to a computer 100. The telephone network system 10 may be located in a home or office, for example. Communication over the telephone network 130 between the telephone 104 and the computer 100 occurs through a computer interface unit (CUI) 102 and a phone interface unit (PIU) 106. Multiple telephones 104 may be coupled to the telephone network 130.

When a user picks up the telephone 104, the computer 100 detects the condition and invokes one or more predetermined application processes to receive and process voice commands from the user. If the user issues a command to place a telephone call over the network 12 to a desired target, a network phone call application program may cause the computer 100 to issue a call to a specified destination, such as an Internet Protocol (IP) address, to connect to a remote terminal 14 having audio conferencing capabilities. The remote terminal 14 may be adapted to include the same or similar components as the system 10. Alternatively, the remote terminal 14 may be a conventional system fitted with appropriate hardware and software to perform audio conferencing.

The computer 100 is also configured to receive incoming network phone calls from a remote location. The computer 100 notifies the user of an incoming call either through its speakers or by activating a ringer placed in the PIU 106.

The computer 100 is adapted to receive commands from a user (through telephones) to perform tasks, including placing a network phone call. In addition, the computer 100 is able to receive and process phone calls (from the network 12 or over a regular telephone line).

TELEPHONE SYSTEM

Figure 1:
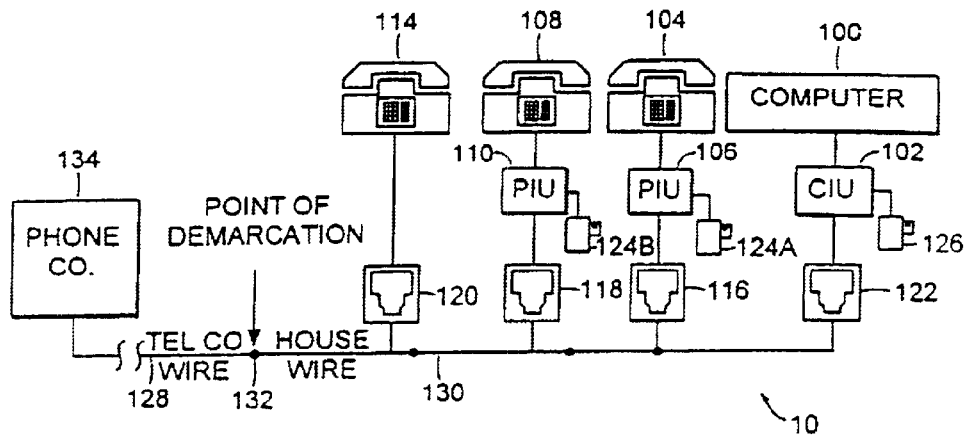
FIG. 1 is a block diagram of a telephone network system according to one embodiment in which telephones communicate with a computer system by radio frequency signals over an existing phone line.

FIGS. 1–4 illustrate different exemplary configurations of the telephone network system 10. In the illustrated embodiments, one or more telephones may be connected in the telephone network system 10. In FIG. 1, the telephone network system 10 includes PIUs 106 and 110 placed between telephones 104 and 108 (referred to as PIU-connected telephones) and wall jacks 116 and 118, respectively. A telephone 114 may be connected directly to a wall jack 120 (referred to as a non-PIU telephone). A computer interface unit (CIU) 102 is connected between the computer system 100 and a wall jack 122.

The wall jacks 116, 118, 120 and 122 can be standard RJ-11 telephone jacks, for example. Each of the wall jacks 116, 118, 120 and 122 is connected to the local or internal telephone network line 130, which is connected to an external phone line 128 at a "point of demarcation" or a "network interface" 132, and ultimately to switching circuitry located at a telephone company central office 134. When an external phone call is in progress, each PIU behaves as a wire and connects its respective telephone to the telephone network line 130.

Internal communication in the telephone network system 10 can occur between one of the PIU-connected telephones and telephone communication software running in the computer system 100. In this description, communication between a PIU-connected phone and the computer system 100 is referred to as a "Homewires" telephone communication or call. A user can issue commands, make inquiries, and access information simply by picking up the nearest PIU-connected telephone to access the computer system 100 remotely. The telephone communication software, depending upon user selection, responds by either providing a voice greeting or, alternatively, causing the PIU to connect the telephone to the telephone network line 130 so that the user hears a dial tone. If the latter option is selected by the computer, then the user can perform a flash hook on the telephone (for example, hanging up the telephone for less than one second) to override the computer selected option, and the telephone communication software will cause the PIU to disconnect the telephone from the line 130 and connect the telephone to the computer system 100. Once connected to the computer system 100, the user can issue voice commands by simply speaking. To switch the phone back to normal mode, the user can ask the computer for an outside line before dialing.

For example, a user might pick up a telephone and say: "Dial John Smith," to which the computer might respond with the statement: "At home or at work!" In response, the computer system 100 may issue a call over the regular telephone lines 128 (regular POTS call), or over the network 12 (e.g., Internet), as illustrated in FIG. 20.

Other possible voice commands include: "Turn off all the lights in the house" or "close the garage door." The telephone communication software in the computer system 100 would recognize and comply with these requests by sending commands to a home automation and control network (not shown), such as the X10 System from Radio Shack, or a SmartHouse network.

In another example, the computer system 100 may be connected to a home security system. Upon waking, a parent might pick up a telephone to ask the computer system the last time someone came home. Thus, depending upon the configuration desired by a user, the computer system can be instructed to perform any number of tasks by recognizing voice commands over the internal telephone network 130.

In FIG. 1, communication between the PIU-connected telephones 104 and 108 and the computer system 100 may be achieved through radio frequency (RF) communication between the PIUs 106 and 110 and the CIU 102 over the internal telephone network line 130. The phone company central office 134 monitors the DC current on the phone line to detect if a telephone has been taken off-hook. When a PIU-connected telephone is initially picked up, the PIU supplies power to the telephone instead of the phone company 134 supplying that power, and thus prevents the telephone from seizing the telephone network line 130. This effectively isolates the telephone from the external phone line 128, allowing the telephone to communicate with the CIU 102 by RF carrier signals sent over line 130.

The RF carrier signal over the telephone line 130 may be a "high-level" or a "low-level" RF carrier signal. A low-level RF carrier signal is a signal having less than a predetermined amplitude and of a frequency range to allow it to co-exist with baseband signals on the telephone line 130. This may be governed by governmental regulations, such as regulations set by the Federal Communications Commission. FCC regulations do not allow sending voice-band signals over the phone lines while the phone company 134 thinks the phones are on-hook. To do so is considered leaked communication. Above 270 kHz, however, the FCC does allow signaling over phone lines up to 15 dBV (about 5 volts in amplitude) while all baseband-connected telephones are on-hook, and up to −15 dBV (about 0.17 volts in amplitude) otherwise.

Frequency modulation may be used to create two voice channels between 270 kHz and 495 kHz. Although not required by the FCC, 495 kHz is chosen as an upper limit to avoid potential interference with radio equipment. In one embodiment, a channel centered at 310 kHz may be used for voice communication from the computer system 100 to the user (CIU to PIU), and a channel centered at 485 kHz may be used to send voice communication from the user to the computer system 100 (PIU to CIU). Each channel can be set to a bandwidth of about 20 kHz, for example. Further embodiments may utilize channels centered at other frequencies. Also, if other types of equipment are used and/or if governmental regulations are changed such as in different countries or over time, signals of different frequencies and amplitudes may be used in other embodiments.

If high-level RF carriers are used, then when the non-PIU telephone 114 is picked up, the CIU 102 turns off its carrier signal to force all telephones to revert to ordinary telephone operation. If low-level RF carriers are used, it is possible for the RF carrier to co-exist on the line 130 with baseband voice or modem communication.

Power can be provided to the PIUs by a high-level RF power carrier generated by the CIU 102 and conducted over the telephone network line 130. The same RF carrier can be used to carry both the power and the voice data from the CIU 102 to the PIUs. Alternatively, the power for the PIUs may be provided by an RF carrier separate from the RF voice carrier. In another embodiment, as the RF impedance of the telephone network line 130 may make it difficult to provide enough power to the PIUs while their associated telephones are in use, a rechargeable battery (not shown) can optionally be included in each PIU. When no outside phone call is in progress, the CIU 102 in this other embodiment provides a power carrier to charge the PIUs' batteries. If additional power is required, the PIUs 106 and 110 can optionally be equipped with AC wall-cube adapters 124A and 124B, respectively. Power to the CIU 102 can be provided by plugging an AC wall-cube adapter 126 into an AC power outlet, for example. Alternatively, power may be provided to the CIU 102 through a port in the computer system 100.

Installation of the system may be relatively simple for a user. For each telephone to be equipped with a PIU, the user unplugs the telephone at the wall, plugs the PIU into the wall jack, and plugs the phone into the-PIU. Telephones not connected to PIUs function normally. The user connects the CIU 102 to the computer system 100, to a power outlet through adapter 126, and to the wall jack 122. The CIU 102 is connected to the serial port of the computer system 100, with the communication between the CIU 102 and the computer system being according to a serial bus protocol. Alternatively, the CIU 102 can connect to the computer system 100 through a Universal Serial Bus (USB) port or through a bus slot, such as an Industry Standard Architecture (ISA) bus slot, an Extended Industry Standard Architecture (EISA) bus slot, a Peripheral Component Interconnect (PCI) bus slot, or a PCI-X bus slot. Other ports of the computer system can also be used to connect to the CIU 102, such as the parallel port. Other example possible interfaces to the computer system include Next Generation 110 (NGIO), Futurebus, and IEEE 1394 serial bus.

To communicate over the telephone network line 130 using RF carriers, a number of conditions are needed. First, noise and interfering sounds on the phone line is relatively quiet in comparison to the voice signal to allow the voice recognition software in the computer system 100 to operate reliably. Further, FCC regulations or other governmental regulations are satisfied.

Figure 4:
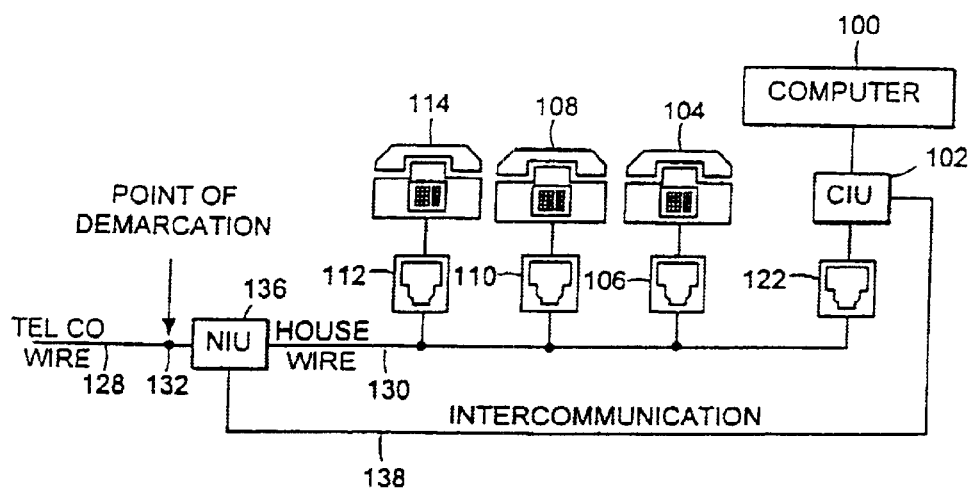
FIG. 4 is a block diagram of a telephone network system according to a fourth embodiment in which telephones communicate with a computer system over an internal phone line by baseband voice communication.

The FIG. 4 embodiment of the telephone network 10 has all the telephones 104, 108 and 114 connected directly to the wall jacks 106, 110 and 112, respectively, in the normal telephone configuration. A network interface unit (NIU) 136 is installed at the point of demarcation 132. Power is supplied by the NIU 136 locally to the telephones 104, 108 and 114, and communication between the telephones and the computer system 100 occurs over the internal phone line 130 at baseband. A communication link 138 (which can be a wire link or a wireless electromagnetic link) between the computer system 100 and the NIU 136 allows the computer system to "talk" to the telephones, or to switch the telephone network into "normal phone" mode by connecting the internal phone line 130 to the external phone line 128 through NIU 136.

Figure 2:
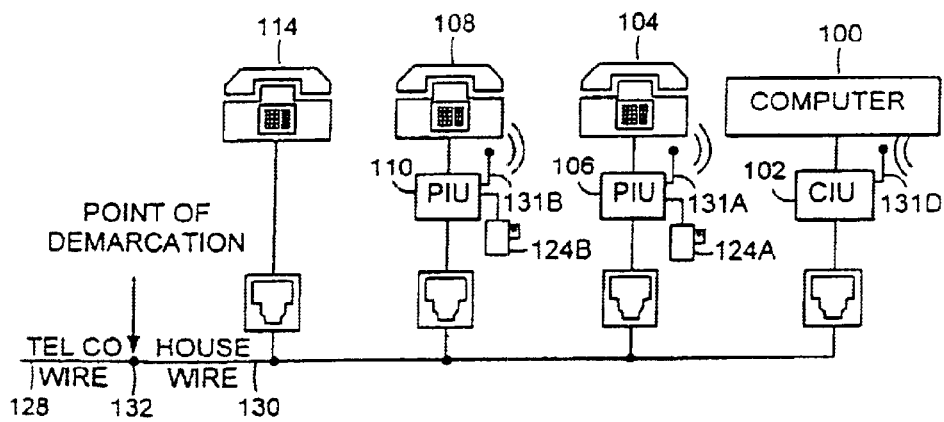
FIG. 2 is a block diagram of a telephone network system according to a second embodiment in which telephones communicate with a computer system by electromagnetic wave signals.

Referring to FIG. 2, another embodiment of the network 10 connects the PIUs 106 and 110 between the telephones 104 and 108 and the telephone network line 130, but transmits the modulated information between each PIU and the CIU 102 electromagnetically (or by some other wireless mechanism) between transmitters 131A and 131B (connected to the PIUs) and a transmitter 131D (connected to the CIU 102).

Figure 3:
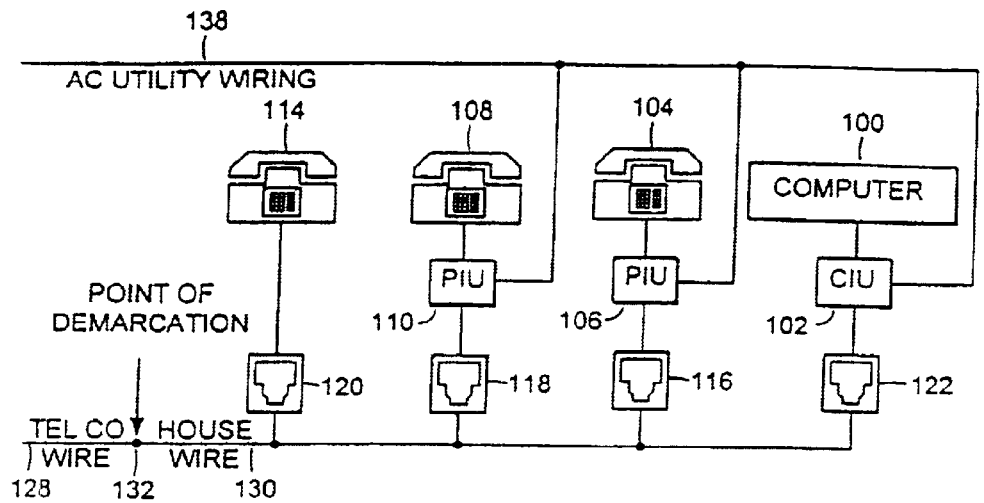
FIG. 3 is a block diagram of a telephone network system according to a third embodiment in which telephones communicate with a computer system by radio frequency signals sent over AC utility wiring.

The FIG. 3 embodiment connects the PIUs 106 and 110 between the telephones 104 and 108 and the telephone network line 130, but transmits the modulated information from each PIU to the CIU 102 over AC utility wiring 138.

Referring again to FIG. 1, connecting a telephone through a PIU allows the telephone according to one embodiment to operate in either of two modes. In a first mode, the PIU behaves as a wire and the telephone acts like a regular telephone connected to an outside line. This mode occurs either when power is not presented to the PIU, or when the CIU 102 stops sending its RF carrier.

In a second mode, the PIU and CIU act as a full-duplex RF voice interface between the computer system 100 and the user through telephones 104 and 108. In this mode, the telephone is isolated from the phone line 130 at baseband, and the phone company 134 detects that all the telephones connected to the internal telephone network are on-hook. In the second mode, the PIU receives voice communication over the CIU RF carrier from the CIU 102. The PIU sends voice communication to the CIU 102 over a second voice carrier (PIU RF carrier). The PIU RF carrier occupies a frequency band distinct from the frequency band used for the CIU RF carrier. Frequency modulation (FM) may be used to place the voice signals in the selected frequency bands. Alternatively, other modulation methods, such as amplitude modulation (AM), can be used.

Since the CIU 102 performs the line monitoring functions needed to determine when the PIU should be placed in mode 1 and when it should be placed in mode 2, the existence or lack of the CIU carrier is used to communicate this information to each PIU. When the PIU detects the presence of the CIU carrier, it isolates the phone from the phone line 130, and places the PIU in mode 2. If the CIU 102 detects a condition that requires all the telephones to be placed in mode 1, it shuts off the CIU carrier to place the PIUs in mode 1.

In one configuration, when a PIU-connected telephone is picked up, the CIU 102 responds by shutting off the CIU RF carrier, after the first few milliseconds. The PIU is switched into mode 1 and behaves as a wire to allow the telephone to seize the line 130. The user then hears a dial tone. If the user wants to talk to the computer system 100, the user issues a flash hook (for example, hitting the hang-up button for less than one second), and the telephone communication software responds by causing the CIU 102 to re-transmit the CIU RF carrier to turn the PIU back on (that is, to mode 2). Once the PIU isolates the telephone from the telephone line 130, communication can occur between the user and the computer system 100.

Alternatively, the system may be configured such that when a user picks up a PIU-connected phone, a greeting from the computer system 100 is heard. The user may ask for a dial tone by issuing a voice command or a flash-hook.

The communication system may have excellent isolation between houses or locations. PIU and CIU carriers are primarily differential-mode signals while coupling between telephone company wire pairs is primarily common mode. In addition to this, the lossy nature (above voice band) of the insulation commonly used in phone wiring reduces RF signals coupled to neighbors or other near-by sites to insignificant levels. The phone lines may not be designed to be efficient at the frequencies used for the PIU and CIU RF carriers. As a result, the RF carrier signal from one house or other location becomes attenuated over the distances involved between two houses or other locations so that there may be reduced danger of coupling with carrier signals in another house or location.

NETWORK PHONE CALLS

Figure 21:
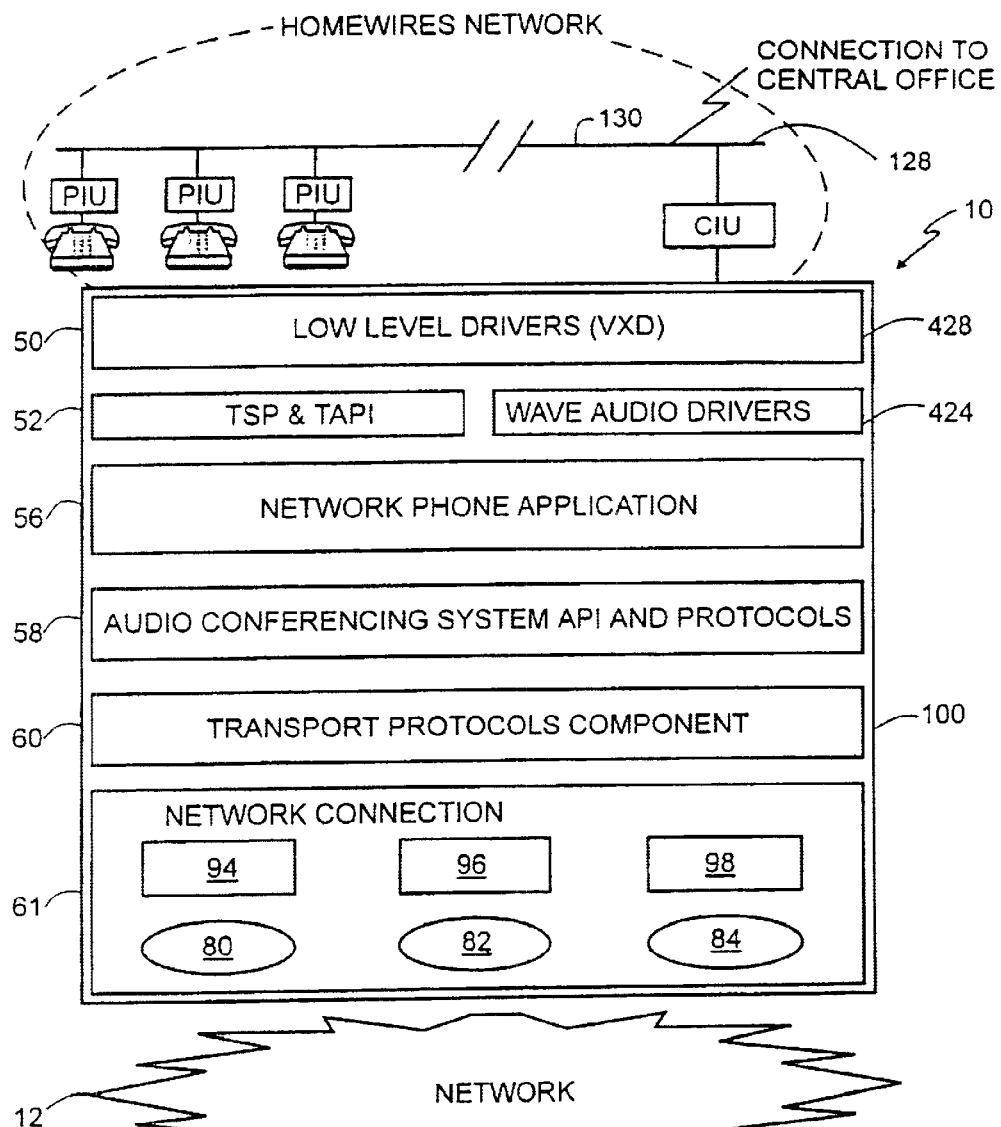

Referring to FIG. 21, to implement the network phone call capability, the computer 100 may include the following components: the network phone application 56; an audio conferencing protocol component 58, e.g., H.323 compatible audio conferencing system application programming interface (API) and protocols; a transport protocol component, e.g., a transmission control protocol/Internet protocol (TCP/IP) and user datagram protocol (UDP) component that may be available in some Windows® operating systems; and a network connection layer 61.

The network connection layer 61 provides the physical link to the network 12 (e.g., the Internet, a local area network or LAN, a wide area network or WAN, or other type of network and communications channel) and may include different types of connection devices, e.g., an ISDN modem 94 for connection to a digital telephone network 80; an analog modem 96 (e.g., a 56 kbps modem) for connection to an analog telephone line 82 (which can be the telephone line 128 or a different line); a cable modem 98 for connection to a broad band cable network 94; or another type of transceiver for communicating with the network 12. Another possible connection is the interactive digital subscriber line (ISDL), which can provide high speed continuous network connectivity at consumer prices.

If the analog modem 96 shares the same line 130 as the telephone network system 10, the analog modem call can operate simultaneously over the same wires as a Homewires call. In this configuration, a Homewires user can be interacting with the computer over the Homewires connection while the computer is simultaneously dialing out to the network over the same physical wires. Similarly, a baseband audio call (normal POTS call) may take place on the same line concurrently with a Homewires call.

Alternatively, the analog modem 96 and telephone network system 10 may use different telephone lines.

The transport protocol component 60 converts messages or packets to the proper format to allow the computer 100 to connect and exchange data over the network 12. The audio conferencing system component 58 provides the network phone protocol engines, such as H.323 compatible audio conferencing system API and protocols products. The H.323 standard is a protocol providing for audio, video, and data communications across IP-based networks, including the Internet.

To improve the speed of point-to-point communications between the telephone network system 10 and a remote terminal, special processing of the voice data may be performed. For example, the voice data may be compressed at the transmitting end and decompressed at the receiving end to reduce the amount of data that needs to be transferred and thus enhance communication speed.

In a further embodiment, a network phone call may be performed even if a computer system 100 at one end is not initially on-line on the data network 12. In such a system, a user may leave their computers in such a mode that communication software in the computer system is ready to answer incoming calls on the telephone or fax line. The calling party's computer may then call the receiving party's computer over a normal POTS call and tell it to log onto the data network to receive an Internet phone call. Following the brief normal POTS call, both computers may hang up and log onto the data network. Following that, the computer systems at the receiving and transmitting ends may then establish a data network telephone connection.

Figure 22:
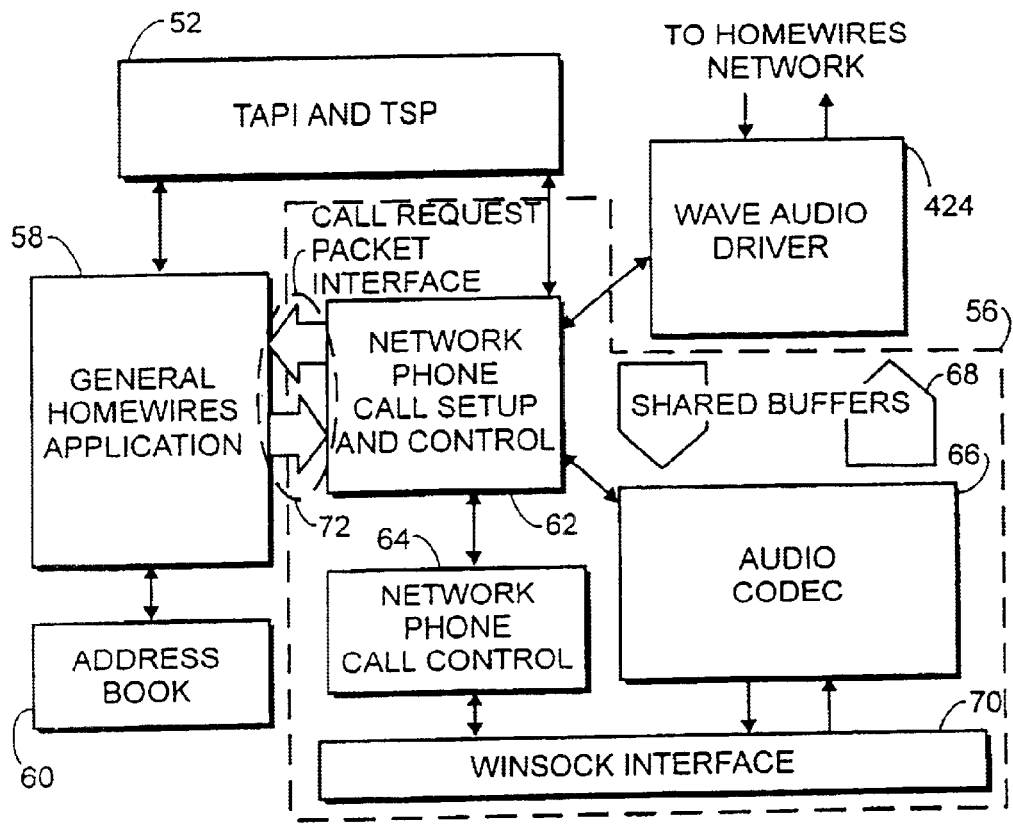
FIG. 22 is a block diagram of software layers in a computer system that handles network phone calls according to one embodiment.

Referring to FIG. 22, the network phone application 56 includes several layers, including a network phone call setup and control component 62 that communicates with a general Homewires application 58 and handles menuing and voice recognition activities, e.g., such as handling the command "call John on the Internet" as described above, The interface between the network phone call setup and control component 62 and the general Homewires application 58 can be a call request packet interface 72. Both the general Homewires application 58 and the network phone call setup and control block 62 can connect to the Homewires Telephony Application Programming Interface (TAPI) line 52 provided by a TAPI service provider (TSP) 426. Communications between the network phone application 56 and CIU 102 occur through the TAPI line 52, wave audio drivers 424, and low level driver layer 50.

There are two types of calls that can come through the Homewires TAPI line 52—an "automated voice" type call that the general Homewires application 58 accepts by connecting to the TAPI line 52 as the owner; and an "interactive voice" type call that the network phone call setup and control component 62 accepts by connecting to the TAPI line 52 as the owner. The TSP 426 offers calls initially as automated voice type calls so that they are handled first by the general Homewires application 58.

In one embodiment, the network phone call application 56 may also include a network phone call control component 64 (which can be an H.323-compatible program for interfacing to other H.323 components over the network for handling network communications); and an audio codec 66 (e.g., an H.323 audio codec) that receives digitized audio data from the network, which are passed to the audio wave driver 424 through buffers 68. The audio wave driver 424 samples the audio data and converts it to wave data for forwarding to the Homewires network 10 through the CIU 102. In addition, the network phone call application 56 has bi-directional buffers 68 to buffer data transferred between the wave audio driver 424 and the audio codec 66; and an interface 70 (e.g., a Win32 Winsock interface) for interfacing to the TCP/IP and UDP component.

Figure 23A:
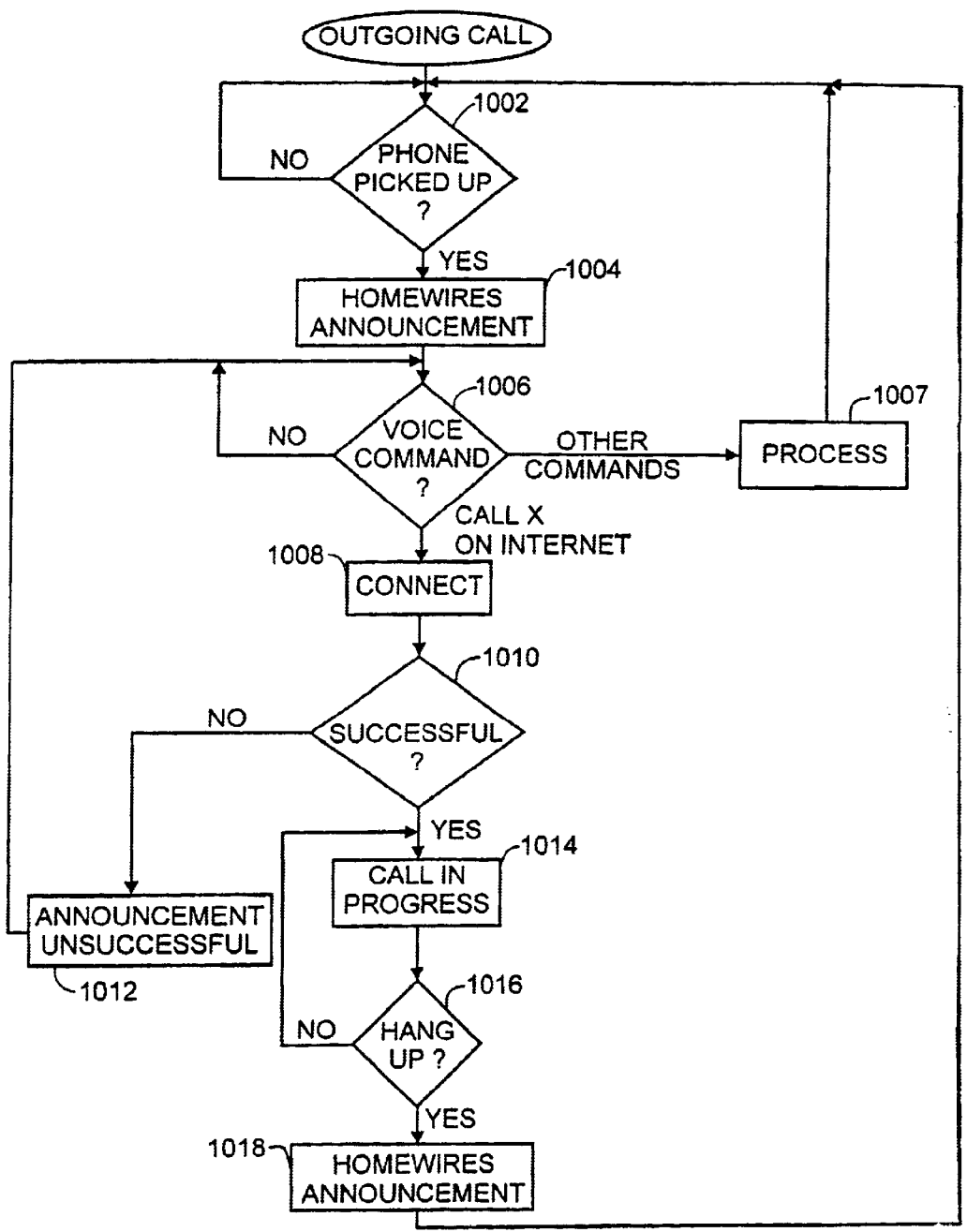
FIGS. 23A and 23B are flow diagrams of a communications program according to one embodiment in the computer system capable of handling network phone calls.
Figure 23B:
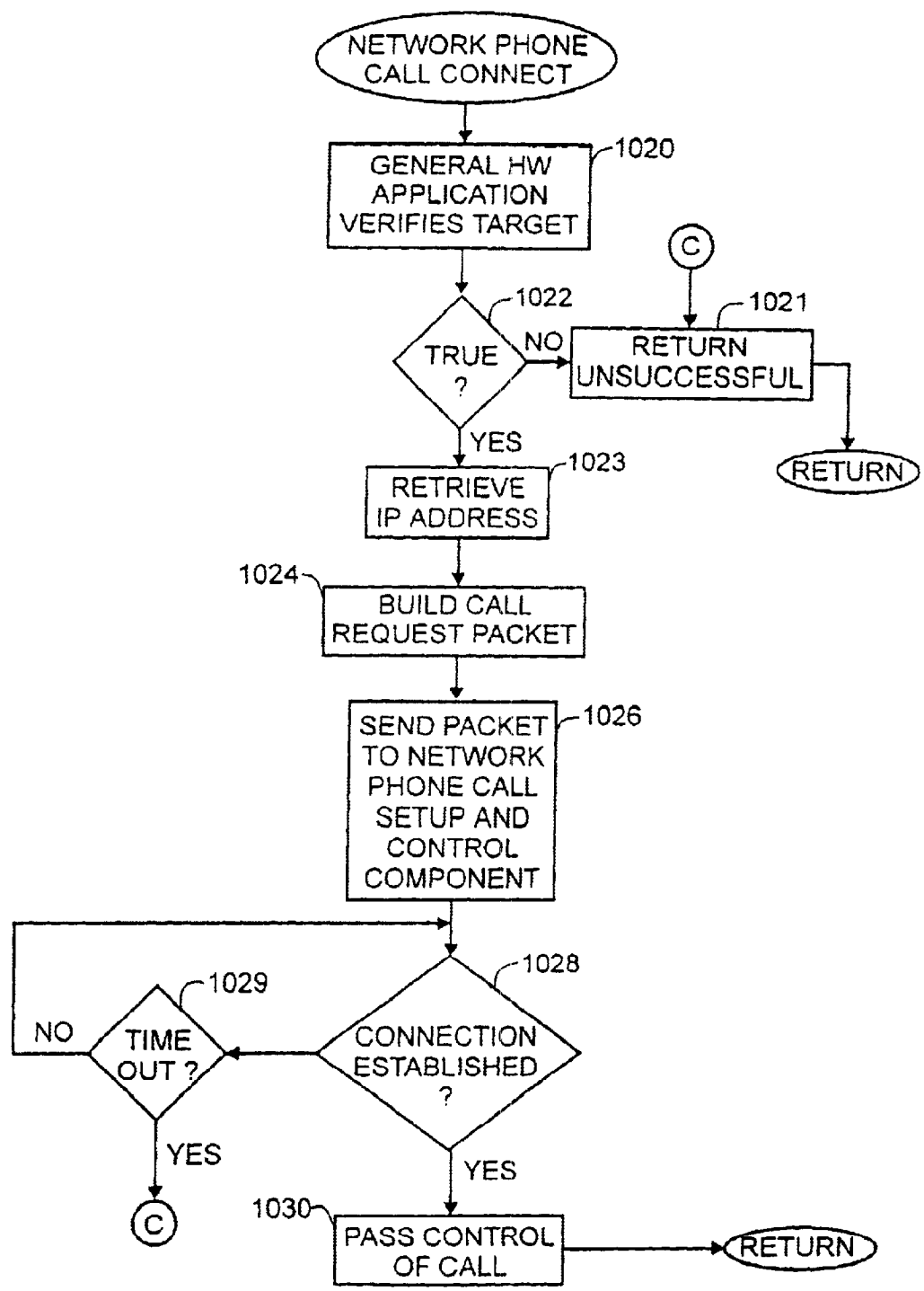

Referring to FIGS. 23A and 23B, the flow for handling outgoing calls by the general Homewires application 58 is shown. The general Homewires application 58 detects if a PIU phone has been picked up (at 1002). In one embodiment, when the user picks up a PIU phone, the user hears a normal dial tone—to access the telephone communication software, the user issues a flash hook. Alternatively, a Homewires greeting may be provided when the user picks up the PIU-connected telephone. When the general Homewires application 58 detects that a phone has been picked up, it provides a Homewires announcement, e.g., "Homewires is here" (at 1004). The general Homewires application 58 then waits for the user to issue a voice command, e.g., "call [name/relationship] on the Internet" (at 1006). Alternatively, a phone call may be issued by activation of an input device (e.g., mouse, keyboard) coupled to the computer system 100. Upon receipt of the voice command or other command to access the network 12, the general Homewires application 58 proceeds to connect to the network 12 and to access the requested target (at 1008, described in greater detail in FIG. 23B). If the Homewires application 58 is unsuccessful in connecting to the target (at 1010), it announces that fact to the user (at 1012) and proceeds to 1006 to wait for the user to issue another voice command, at which point the user can offer an alternative target, terminate the call, or ask for other functions (processed at 1007).

If the connection is successful, then the general Homewires application 58 proceeds to handle the call in progress (at 1014). If a hang-up is detected (at 1016), then the network phone call is terminated, and the Homewires application 58 issues an announcement (at 1018), e.g., "Homewires is here," to let the user know that the Homewires system is still connected.

FIG. 23B shows the network phone call connect flow started by the general Homewires application 58 in response to a user request. First, the general Homewires application 58 verifies that the target is in the address book 60 (at 1020). If the target is not in the address book (as determined at 1022), then a message indicating that the connection was unsuccessful is returned (at 1021). If the target is verified, then the general Homewires application 58 retrieves the network address, e.g., IP address, from the address book 60 (at 1023). A call request packet is then built (at 1024) and sent to the network phone call setup and control component 62 (at 1026), which then proceeds to establish connection with the network 12 and the targeted system (at 1028). If the connection takes too long, and a timeout occurs (at 1029), then the general Homewires application 58 returns an unsuccessful status (at 1021). If the connection is successfully established, then control of the call is passed to the network phone call application 56 (at 1030).

Figure 24:
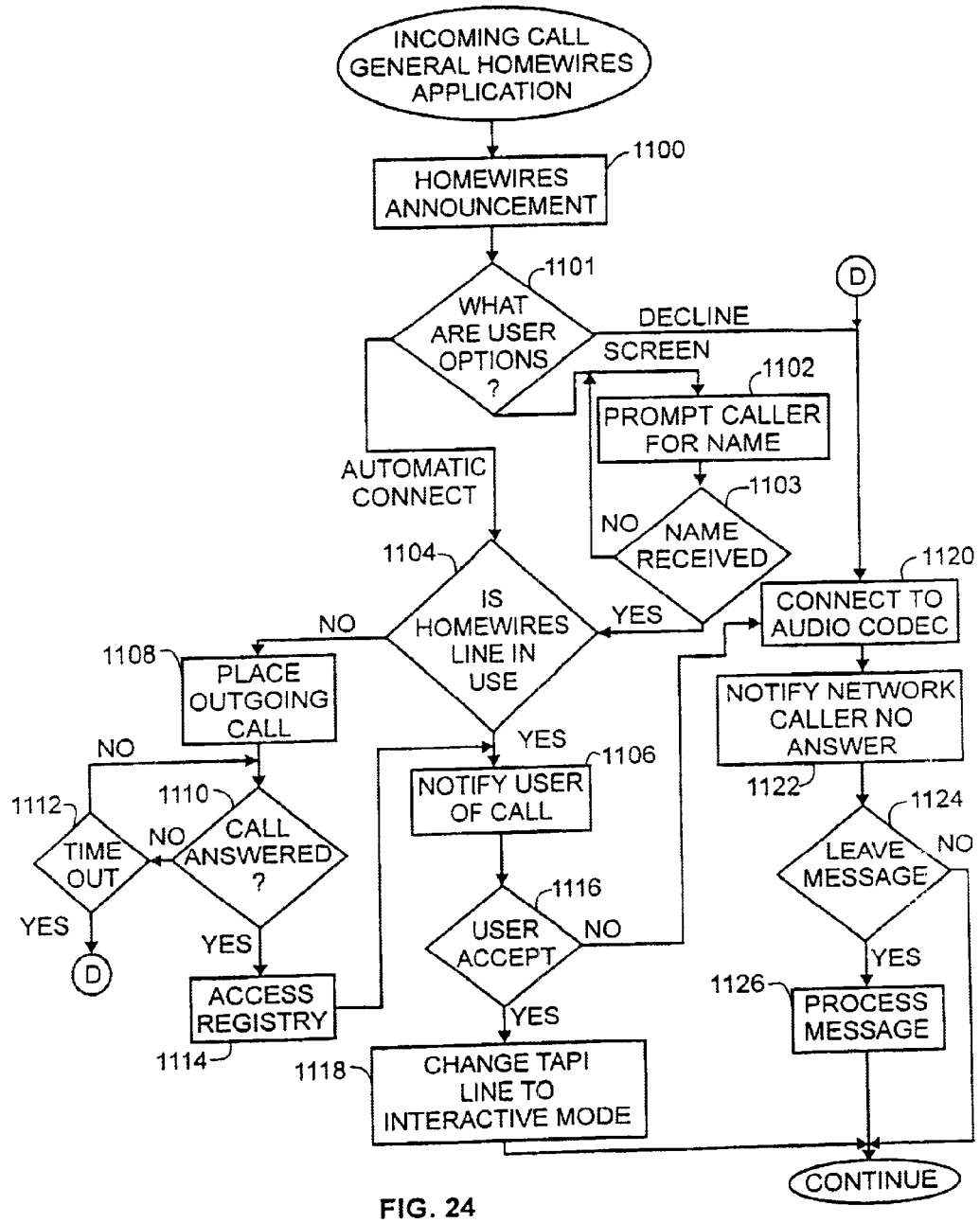
FIG. 24 is a flow diagram of a routine according to one embodiment in the communications program for handling incoming network phone calls.

Referring to FIG. 24, the flow for handling incoming calls is illustrated. Incoming network phone calls received by the network phone call control component 64 are monitored by the network phone call setup and control component 62, which can choose to accept or decline the call as specified by user-selected options. If the network phone call is accepted, then control is passed to the general Homewires application 58. The general Homewires application 58 then issues an external Homewires announcement, e.g., "please wait while I try to connect you" (at 1100).

Next, the Homewires application 58 determines user options for handling incoming network phone calls (at 1101). In one embodiment, there are several possible options: automatically accept calls; screen calls; and decline all calls. If calls are declined, then control passes to acts 1120–1126 to allow the remote caller to leave a voice mail or perform some other act. If calls are screened, then the general Homewires application 58 prompts the remote user for the user's name (at 1102). When the user responds with a name (at 1103), control passes to 1104 where the incoming network phone call is further processed. If the user options (determined at 1101) indicate that incoming calls are to be automatically accepted, then control proceeds directly to 1104.

At 1104, the Homewires application 58 determines if the Homewires line is already in use, that is, a user is communicating with the computer system 100 with a PIU-connected telephone over the line 130. If already in use, then the Homewires application 58 notifies the local user of the remote network phone call (at 1106). Otherwise, if the Homewires line is not active, the general Homewires application 58 issues a notification to a local user by placing an outgoing Homewires call through the computer system 100 (at 1108). Depending on how the system is set up, this call can cause ringers in the PIUs to ring, or cause the computer 100 to issue an announcement or message on the computer's loudspeakers, as further explained below.

Next, the general Homewires application 58 checks to see if the call has been answered (at 1110) by a user picking up a PIU-connected telephone. If not, the application checks to see if a timeout has occurred (at 1112). If so, the general Homewires application 58 proceeds to notify the network phone caller that the Homewires user is unavailable and acts 1120–1126 may be performed. If the call is answered, the Homewires application 58 may access the network address registry to determine who is calling (at 1114), and announce the caller to the Homewires user (at 1106).

Next, the Homewires application 58 determines if the user has accepted the call (at 1116). The user may do this by affirmatively responding to a computer system query. If the user has accepted the call, the Homewires application 58 changes the state of the Homewires TAPI line 52 to the interactive voice mode so that the network phone call application 56 can take over (at 1118). If the user declines to accept the call (at 1116) or the call is not answered (acts 1110 and 1112), then the general Homewires application 58 connects to the audio codec 66 (at 1120) to notify the network phone caller that the Homewires system was unable to locate the person and to prompt the caller if he or she wants to leave a message (at 1122). If so (at 1124), the general Homewires application 58 prompts the user to leave the message and records the message (at 1126). Otherwise, control proceeds to other operations.

Figure 25:
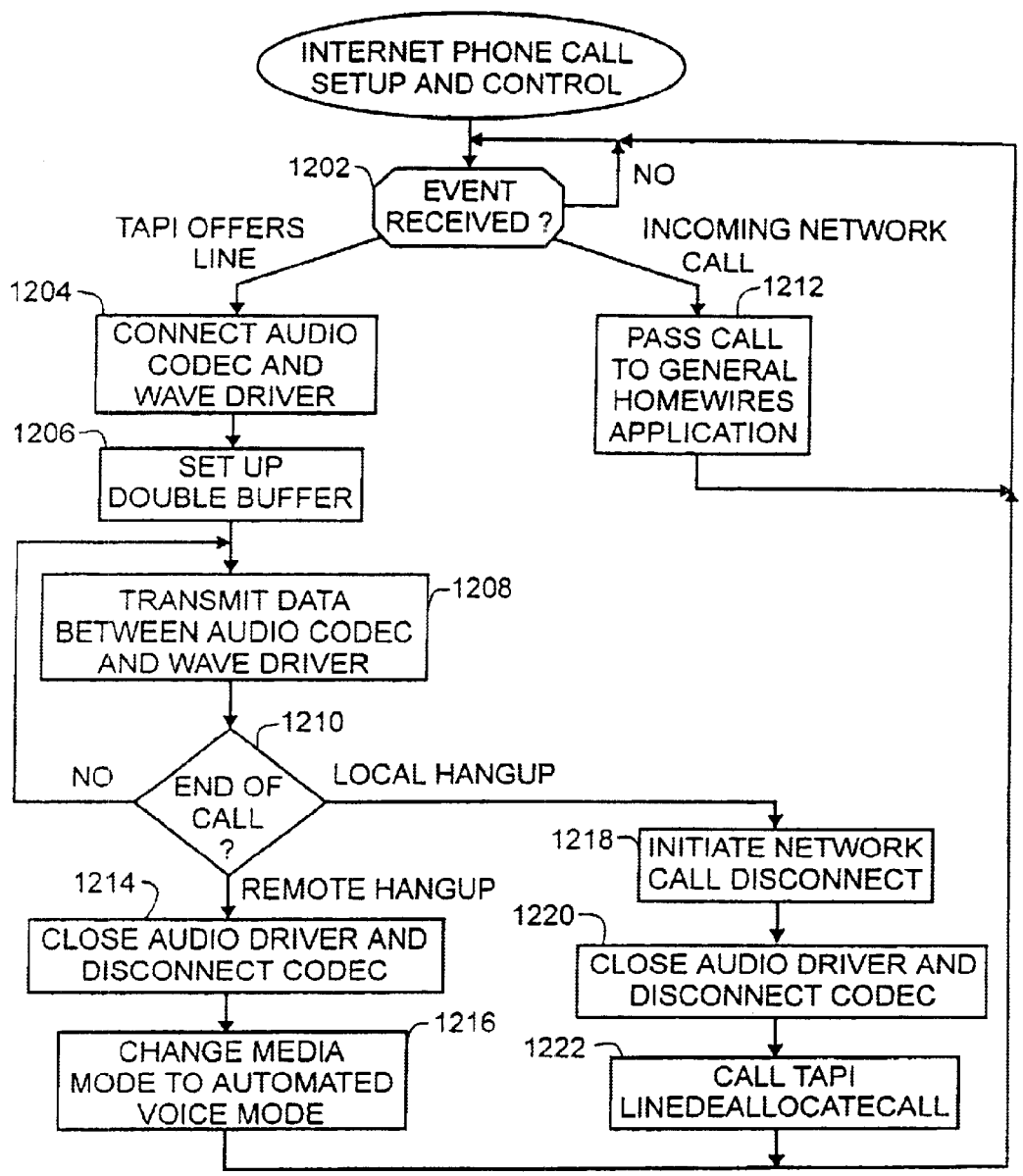
FIG. 25 is a flow diagram of a network phone call setup and control component in the communications program according to one embodiment.

Referring to FIG. 25, portions of the flow of the network phone call setup and control component 62 are shown. Initially, the setup and control component 62 waits for an event to be received (at 1202). One possible event is the TAPI line 52 being offered by the general Homewires application 58 (the mode is set to interactive voice mode); and the other event is an incoming network phone call.

If the event received is an incoming network phone call, the component 62 passes (at 1212) the call to the general Homewires application 58 by keeping the TAPI line media mode at the automated voice mode. The general Homewires application 58 handles the incoming network phone call in accordance with the process described in connection with FIG. 24.

If the event received (at 1202) is that the TAPI line 52 is being offered to the network phone call setup and control component 62 by the general Homewires application 58, the component 62 connects to the audio codec 66 and the audio wave driver 424 (at 1204). Next, it sets up a double buffer management scheme to improve data throughput such that real time communication can occur between the network phone callers (at 1206). Next, any data received by the audio wave driver 424 (from the Homewires network 10) or by the audio codec 66 (from the network 12) is transmitted through the shared buffers 68 (at 1208). Next, the network phone call setup and control component 62 determines if an end-of-call event has occurred (at 1210).

An end-of-call event can occur in one of two ways: a local hang-up (in which a local user hangs up a PIU-connected phone); and a remote hang-up (in which the remote user hangs up). In one embodiment, what constitutes an end of call on the network 12 may be defined by the H.323 protocol or other suitable protocol for voice communications. If the end-of-call event detected is a remote hang-up (which is an indication from the network phone call control component 64 to the setup and control component 62 that the remote user has ended the call), then the audio driver 424 is closed and the audio codec 66 is disconnected (at 1214). The network phone call setup and control component 62 then changes (at 1216) the media mode of the TAPI line 52 from interactive mode to automated voice mode so that the general Homewires application 58 regains control of the TAPI line 52. The general Homewires call returns to any processing that may have been interrupted by the network phone call or to the main voice menu.

When the component 62 detects that a local hang-up has occurred (PIU user has hung up), it initiates a network call disconnect call to the network phone call control component 64 (at 1218), which performs operations defined by the H.323 protocol or other protocol to end the network phone call. Next, the setup and control component 62 closes the audio wave driver 424 and disconnects the audio codec 66 (at 1220). The setup and control component 62 next issues a TAPI LineDeallocateCall event to the computer system 100 to perform predetermined tasks, as discussed below.

PHONE INTERFACE UNIT

The following provides greater detail of layers in various components in the telephone network system 10, including the PIUs, CIUs, and computer 100. It is to be understood, however, that the invention is not to be limited to the details, arrangements, and architectures illustrated, as variations and modifications of the components may be provided in further embodiments. For example, tasks performed by software may be performed in hardware, and vice versa. In addition, tasks performed by different components may be integrated or separated into other components as appropriate.

Figure 5A:
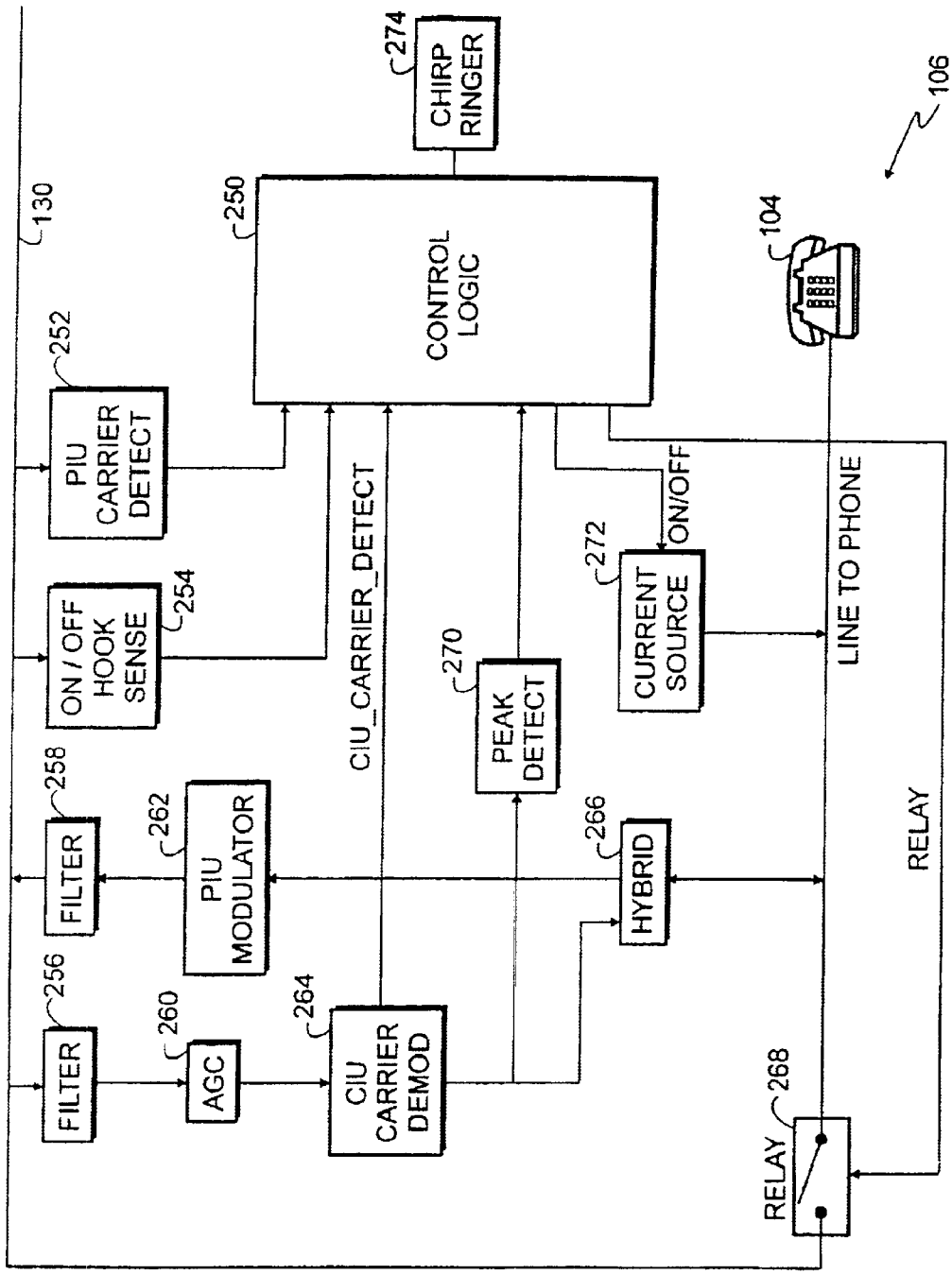
FIGS. 5A–5B are block diagrams of phone interface units according to embodiments connected to a telephone in the system of FIG. 1.
Figure 5B:
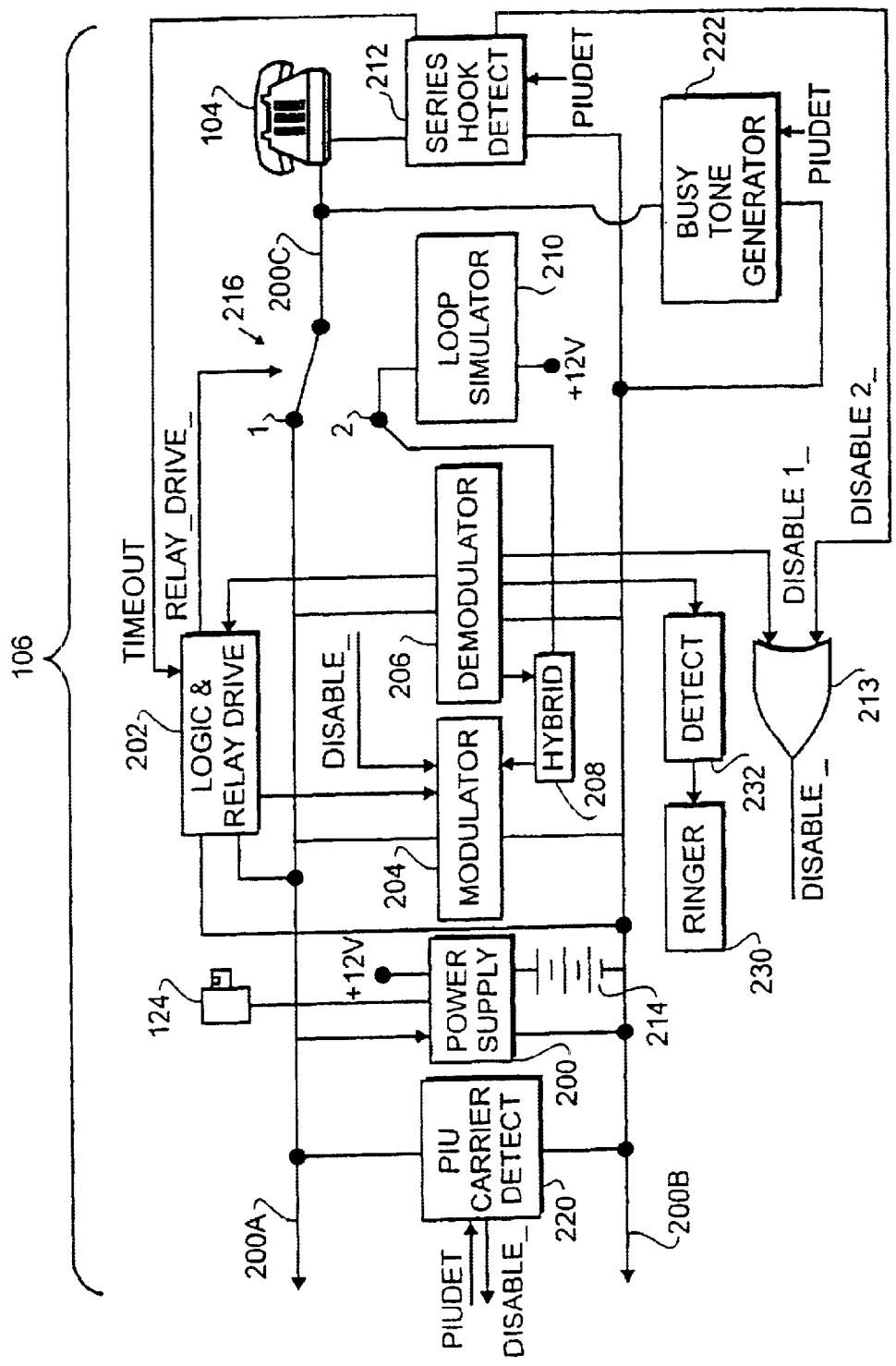

FIGS. 5A and 5B provide different embodiments of a PIU. The PIU according to the FIG. 5A embodiment may be optimized for communication using low-level RF signals, while the FIG. 5B embodiment may be used with high-level RF signals.

Referring to FIG. 5A, an embodiment of the PIU 106 includes a filter 256 to receive signals on the telephone line 130. The output of the filter 256 may be provided to an automatic gain control (AGC) circuit 260 for amplifying low-level RF signals to a known level on the line 130. The output of the AGC circuit 260 is provided to a demodulator 264 to demodulate a CIU carrier received from the telephone line 130. If a CIU carrier is detected, then the demodulator 264 asserts a signal CIU_CARRIER_DETECT that is provided to a controller 250 in the PIU 106. In response to assertion of CIU_CARRIER_DETECT, the controller 250 may drive a signal RELAY to a predetermined state. The signal RELAY is provided to the control input of a relay 268. Assertion of RELAY to the predetermined state causes the relay 268 to open to isolate the telephone 104 from the telephone line 130. Normally, the relay 268 is closed to connect the telephone 104 to the telephone line 130.

When an internal PIU-CIU call (also referred to as a Homewires call) is in progress, a modulator 262 receives a baseband voice signal from the telephone 104 through a hybrid circuit 266. The modulator 262 uses the baseband voice signal to modulate a PIU RF carrier that is provided to the telephone line 130 through a filter 258. The PIU RF carrier may, for example, be a 485-kHZ carrier. The modulator 262 may include a voltage-controlled oscillator (VCO) for generating the RF signal.

The demodulator.264 may receive a CIU RF carrier (for example, a 310-kHZ carrier) and demodulate the voice information from the computer 100 down to a baseband signal for forwarding to the telephone 104 through the hybrid circuit 266.

The PIU 106 according to the FIG. 5A embodiment also includes an audible ringer. This may include a chirp ringer 274 coupled to the controller 250. The chirp ringer 274 may be a piezoelectric buzzer, for example. In one embodiment, a peak detector 270 may be coupled to the output of the demodulator 264 to detect if a special carrier has been received over the line 130 by the CIU 102. Such a special carrier may be in addition to the PIU carrier and the CIU carrier. The output of the peak detector 270 is provided to the controller 250, which may assert a signal to activate the chirp ringer 274.

Alternatively, the chirp ringer 274 may be activated in response to the controller 250 detecting presence of modulation on the CIU carrier in the absence of a PIU carrier.

The PIU 106 in FIG. 5A also includes a PIU carrier detector 252 to detect presence of a PIU carrier provided by another PIU coupled to the telephone line 130. This may be used to prevent two or more PIUs from trying to communicate with the CIU 102 at the same time. In addition, an on/off hook sensor 254 detects if a telephone on the telephone line 130 has been taken off hook. A current source 272 is also included in the PIU 106 in the FIG. 5A embodiment to provide power to the telephone 104 when it is cut off from the telephone line 130. An ON/OFF indication from the controller 250 indicates when the current source 272 is to be activated. The controller 250 may disable the output of the modulator 262 when the PIU is not in use to avoid contention between PIUs on the telephone line 130.

FIG. 5B illustrates another embodiment of the PIU 106 adapted to receive and transmit high-level RF signals over the line 130. Referring to FIG. 5B, an embodiment of the PIU 106 is illustrated. The PIU 106 may include a power supply 200 that rectifies and regulates AC power supplied from the wall-cube adapter 124. The power supply 200 may generate a +12V voltage signal. Alternatively, the power supply may also rectify an incoming CIU power carrier and extract power from the carrier to charge a battery 214 while the telephone 104 is not in use. A relay switch 216 is controlled by a logic and relay drive 202, which in turn is controlled by a signal RELAY_DRIVE_ from a demodulator 206. When the signal RELAY_DRIVE_ is driven low by the demodulator (indicating that the demodulator 206 has detected a CIU RF carrier on lines 200A and 200B from the line 130), the switch 216 is flipped to position 2 to isolate the telephone 104 from the telephone line 130 (mode 2). In mode 2, the telephone 104 is connected to a hybrid 208. When the signal RELAY_DRIVE_ is deasserted high (when no CIU RF carrier is present or when power in the PIU is off), the logic and relay drive 202 places the relay switch 216 in position 1 (mode 1) to connect the telephone 104 to the line 200A.

Thus, even if power is removed accidentally from the PIU, the telephone 104 remains connected to the telephone line to enable POTS calls to the outside (e.g., emergency calls).

When an internal PIU-CIU (Homewires) or mode 2 call is in progress, a modulator 204 (connected between lines 200A and 200B) receives a baseband voice signal from the telephone 104 through the hybrid 208. The modulator 204 uses the baseband voice signal to modulate a PIU RF carrier onto the telephone network line 130, at lines 200A, 200B.

The demodulator 206 (also connected between the lines 200A and 200B) receives a CIU RF carrier and demodulates the voice information from the computer system 100 down to baseband for forwarding to the telephone 104 through the hybrid. The demodulator 206 may include carrier detect circuitry having a band-pass filter that selectively passes the CIU RF carrier. The carrier detect circuitry drives the signal RELAY_DRIVE_, asserting it low if a CIU RF carrier is present. The carrier detect circuitry also provides a signal DISABLE1_to an OR gate 213, whose output drives a signal DISABLE_to the modulator 204. A signal DISABLE2_, provided to the other input of the OR gate 213, is driven high by a series hook detect block 212 when the telephone 104 is not off-hook, that is, no conversation is needed with the computer system 100. The DISABLE_ signal is driven low only if both the CIU carrier is present and the telephone is off-hook. If either the CIU carrier is not present or the telephone 104 is not off-hook, the signal DISABLE_is driven high. If the signal DISABLE_is asserted low, the output of the modulator 204 is tri-stated and placed into a high impedance mode. By presenting the output of the modulator 204 as a high impedance state when not in use, the output stages of the multiple PIUs do not load each other.

If the computer system 100 and the user are both transmitting audio signals simultaneously, the baseband audio signals from the computer system 100 and the baseband audio signals from the telephone 104 are both present at line 200C. The hybrid 208 connected to the modulator 204 and the demodulator 206 serves to subtract the baseband audio signals from the computer system 100 from the signal on line 200C before presenting the baseband signal to the modulator 204. As a result, the signal from the modulator 204 is close to a pure representation of what the user is speaking, with very little background noise from what the computer system 100 is transmitting. This allows the computer system 100 to recognize voice commands when they are given simultaneously with the audio signals coming from the computer system 100.

A loop simulator 210 (connected between the switch 216 and the +12V voltage signal) provides power to the telephone 104 and allows it to operate when the telephone 104 is isolated from the telephone line 130 (mode 2). The series hook detector 212 (connected between the telephone 104 and the line 200B) detects when the telephone 104 is off-hook and asserts the signal DISABLE2_low for powering up the modulator 204 if the off-hook condition is detected. The PIU RF carrier from the PIU alerts the CIU 102 to signal the computer system 100 that voice commands may be issued soon.

A PIU carrier detector 220 is connected between lines 200A and 200B for detecting if a PIU carrier from another PIU is being transmitted. If so, the PIU carrier detector 220 asserts a signal PIUDET high. To ensure that the PIU carrier detector 220 does not assert the signal PIUDET in response to the PIU carrier signal from the modulator 204, the signal DISABLE_is routed into the PIU carrier detector 220. If the signal DISABLE_is high, indicating that the series hook detector 212 has not detected the telephone 104 off-hook, then the possible assertion of the signal PIUDET is enabled. The signal PIUDET is provided to the input of a busy tone generator 222 connected between lines 200C and 200B. The busy tone generator 222 is enabled when the signal PIUDET is asserted high. Thus, if another PIU is transmitting a PIU carrier, and a user picks up telephone 104, the user will hear a busy tone, or in an alternative configuration, the user will hear a busy tone after he or she has performed a flash hook to obtain the POTS line.

The signal PIUDET is also provided to the series hook detector 212 to disable assertion of the signal DISABLE_. Thus if one PIU is transmitting a high-level PIU carrier, another PIU is disabled from transmitting its PIU carrier to avoid contention. The series hook detector 212 also includes a timer that is enabled by the signal PIUDET and the telephone 104 being in the off-hook condition. Thus, if another PIU is transmitting a PIU carrier, and if the user picks up the telephone 104, the timer in the series hook detector 212 begins counting. After a predetermined period of time (for example, 5 seconds), the timer in the series hook detector 212 asserts a signal TIMEOUT to the logic and relay drive 202. In response, the logic and relay drive 202 forces the relay switch 216 to position 1 to place it into mode 1 operation, regardless of the state of the signal RELAY_DRIVE_. In this manner, if a user of a PIU_connected telephone wants to access an outside line, but another PIU_connected telephone is communicating with the computer system 100, the outside line connection can be forced by taking the PIU_connected telephone off-hook and waiting the predetermined period of time. Effectively, the telephone communication software detects this as if a non-PIU telephone has picked up, and responds by cutting off the CIU carrier.

The PIU 106 may also include a ringer 230 that is activated by a detector 332 in response to a special carrier detected by the demodulator 206.

COMPUTER SYSTEM

Although reference is made to a computer system in this system, it is contemplated that other types of systems may be included in further embodiments, including other microprocessor- or microcontroller-based systems. In addition, such systems may be any type of controller, such as portable devices or units or other type of unit (whether stand-alone or part of an overall system) dedicated as an interface between the telephone and the Internet or other network.

Figure 7:
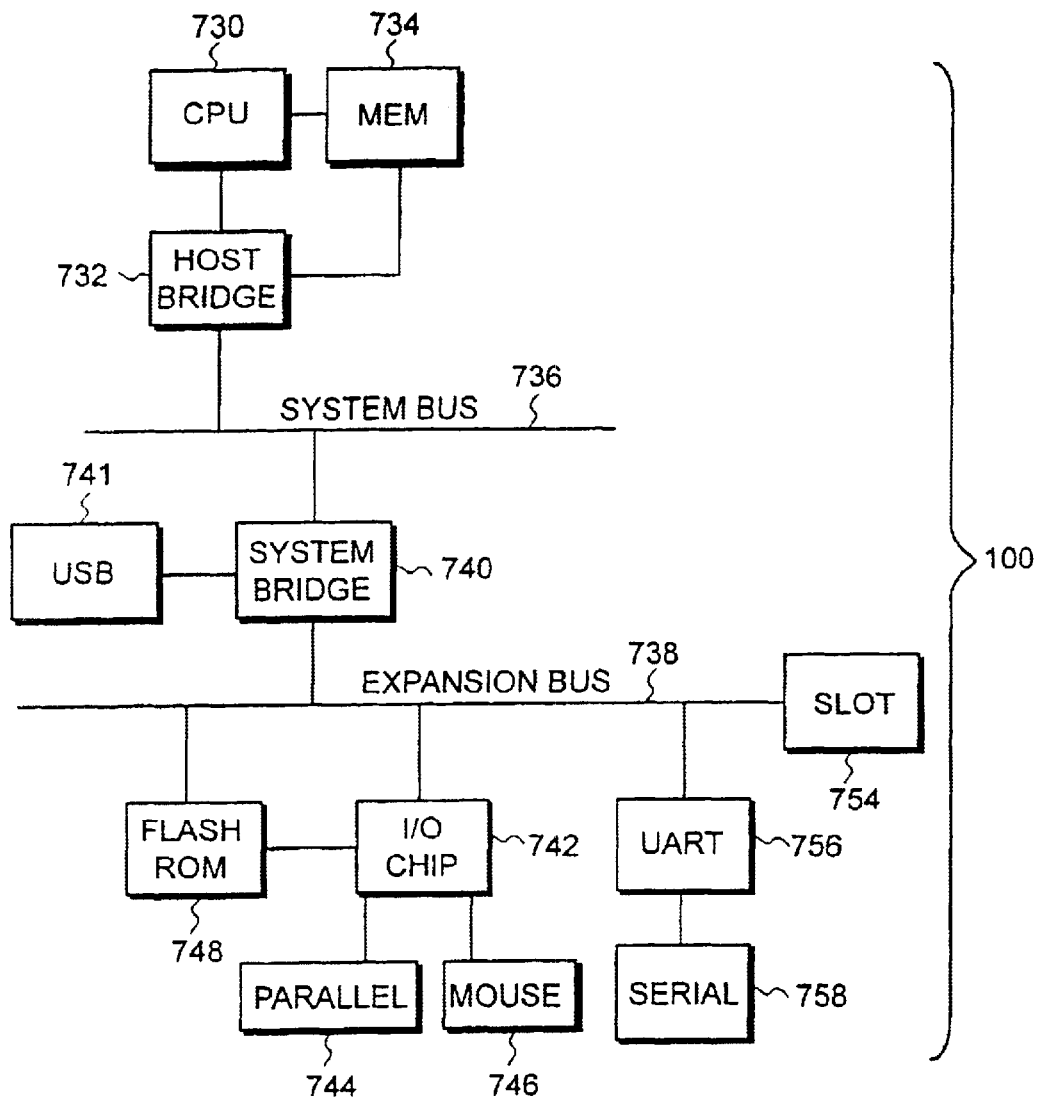
FIG. 7 is a block diagram of an embodiment of the computer system of FIG. 1.

As noted above, the CIU 102 includes an interface to the serial port of the computer system 100. Alternatively, the CIU 102 may be connected to another port in the system for higher throughput. For example, the CIU 102 may be coupled to a USB port, expansion bus port, or system bus port. Referring to FIG. 7, the computer system 100 may include a central processing unit (CPU) 730, such as the Pentium® II or Pentium® III processor from Intel Corporation. The CPU 730 may communicate with a system bus 736, such as a Peripheral Component Interface (PCI) bus through a host bridge 732. The CPU 730 is connected to main memory 734 controlled by the host bridge 732. Communications between the PCI bus 736 and an expansion bus 738 (e.g., an Industry Standard Architecture or Extended Industry Standard Architecture bus) is achieved through a system bridge 740. Peripheral components may be connected to the expansion bus 738. An I/O chip 742 may be connected to control a parallel port connector 744 (for example, for connection to a keyboard) and a mouse connector 746.

The I/O chip 742 may also be connected to a non-volatile memory (e.g., flash memory) 748, which stores the system BIOS of the computer system 100.

The expansion bus 738 may include an expansion slot 754 for connection to an expansion device, such as an ISA implementation of the CIU board 102. A UART device 756 is connected between the expansion bus 738 and a serial port 758 for connection to a serial device, such as the serial port implementation of the CIU 102 (FIG. 6B). The UART 756 translates the serial bus communication from the serial port 758 into expansion bus format, and vice versa.

A USB port 741 may also be coupled to the system bridge 740. The USB port 741 may be coupled to an embodiment of the CIU 106 that includes a USB interface. Other possible interfaces (such as those listed earlier) may also be used to interface to the CIU.

Software, as described elsewhere in this description, executable in the system is able to respond to commands issued by the user over a telephone, or alternatively, by other mechnaisms—such as through a dedicated microphone and the like.

COMPUTER INTERFACE UNIT

Figure 6A:
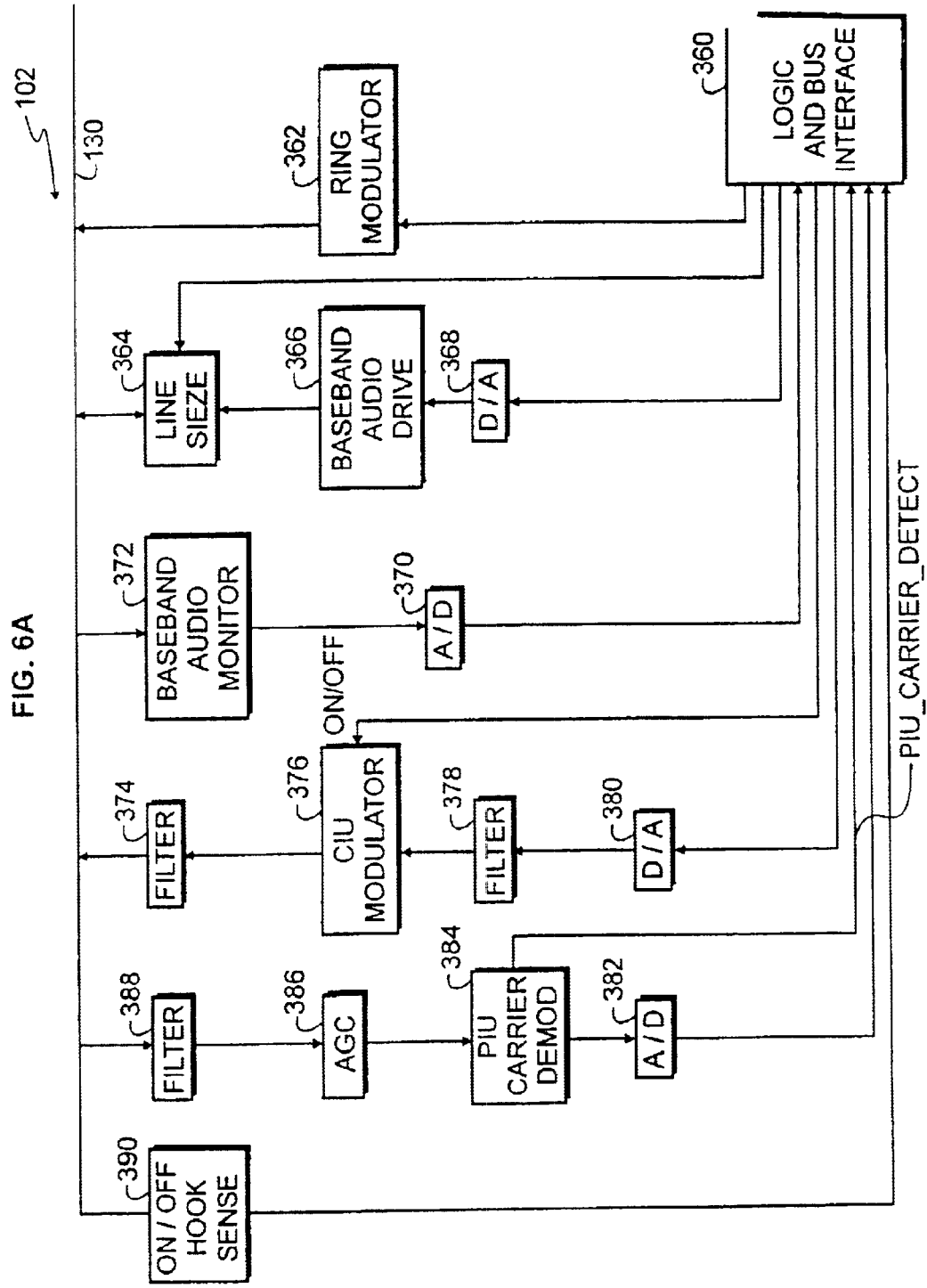
FIGS. 6A–6B are block diagrams of computer interface units according to embodiments connected to the computer system of FIG. 1.
Figure 6B:
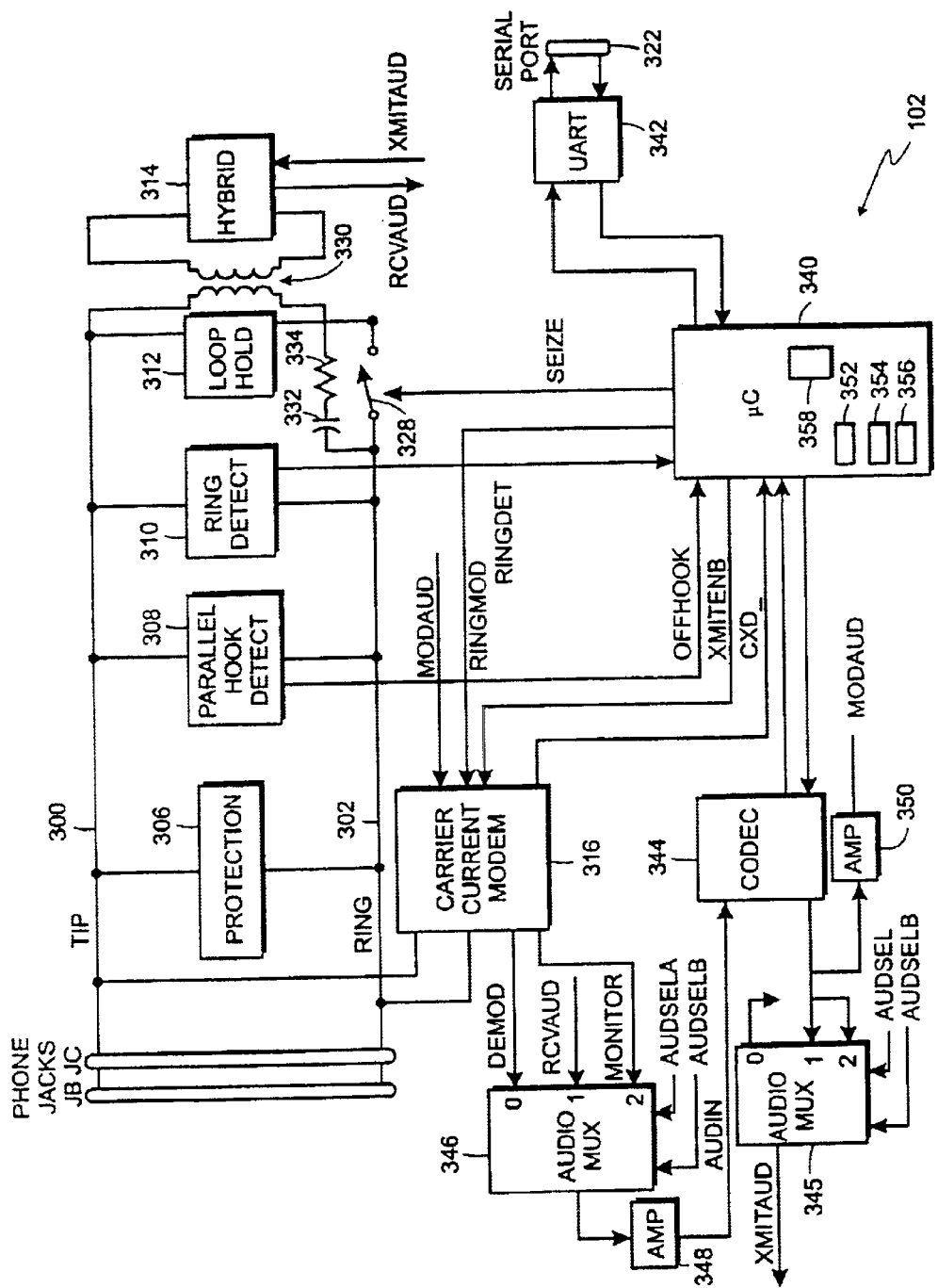

FIGS. 6A and 6B illustrate embodiments of the CIU 102. The FIG. 6A embodiment may be adapted to detect and to transmit a low-level RF signal on the telephone line 130. In addition, the FIG. 6A embodiment of the CIU 102 is capable of concurrently monitoring both a POTS call and a Homewires call. There may be at least two different ways in which a POTS call and a Homewires call may be taking place concurrently. One example is that a Homewires call may be taking place internally in the home or other site, such as when someone is giving commands to the computer system 100 over a PIU-connected telephone. While the internal Homewires call is active, a phone call may be received on a POTS line. Using the CIU 102 of the FIG. 6A embodiment, the POTS call is allowed to pass over the telephone line 130 to all the telephones to allow those telephones to ring. The only one that may not ring is the one in which the user is talking into for the Homewires call. Once the POTS call is answered, both a Homewires call and a POTS call may be in progress concurrently. In fact, a user on a Homewires phone can answer a POTS call that has been answered by the computer system 100. In this case, the computer system 100 effectively functions as a switchboard to enable the Homewires call to talk through the computer system 100 to someone on a POTS call. In another example, a voice-mail system of the computer system 100 may answer the incoming POTS call, ask the caller to identify himself or herself, and then pass the voice information on to the person on the Homewires call. In the latter example, the computer system 100 is capable of both monitoring and speaking to different persons on the POTS line and the Homewires line concurrently.

Referring to FIG. 6A, the CIU 102 according to the first embodiment includes an off-hook detect circuit 390 that is coupled to the line 130 to detect if a phone is taken off-hook. An indication is provided to a controller and bus interface circuit 360. The CIU 102 also includes circuitry to detect a PIU carrier on the line 130. Such a carrier is passed through a filter 388 and an AGC circuit 386 to a demodulator 384. The presence of a PIU carrier is indicated on a PIU_CARRIER_DETECT signal provided to the controller 360. The output of the demodulator 384 may also be provided through an analog-to-digital (A/D) circuit 382 to provide a digitized representation of the PIU signals to the controller 360. On the transmit side, the controller 360 may provide digital baseband voice signals to a digital-to-analog (D/A) circuit 380, whose output is coupled through a filter 378 to a modulator 376. The CIU modulator 376 is activated by an ON/OFF signal from the controller 360 to produce a CIU RF carrier onto the line 130 through a filter 374.

The CIU 102 according to the FIG. 6A embodiment may also include a baseband audio monitor circuit 372 that is coupled to receive a POTS call on the line 130. The output of the baseband audio monitor circuit 372 is provided through an A/D converter 370 to the controller 360. To enable the computer 100 to provide voice to the telephone line 130 for a POTS call, the controller 360 may output a digitized representation of voice signals to a D/A converter 368 that produces analog signals to a baseband audio driver 366. The controller 360 also provides control signals to a line seize circuit 364 that is adapted to seize the telephone line 130 for a POTS call. The baseband audio signals that have been converted from digitized voice signals may then be produced onto the telephone line 130 to carry on a POTS call to remote caller.

The controller and bus interface 360 is adapted to communicate with the computer system 100 through a pre-defined port, such as a serial port, parallel port, USB port, or a bus slot. A USB port or a bus interface may provide higher bandwidth interfaces as compared to a standard serial port, which may be desirable for the transfer of data involved in concurrent POTS and Homewires calls through the CIU 102.

The CIU 102 according to the FIG. 6A embodiment also includes a ringer modulator 362 to modulate a special carrier onto the line 130 to ring chirp ringers in the PIUs. This may be performed when a network phone call is detected by the computer system 100 and a user needs to be notified.

Referring to FIG. 6B, another embodiment of the CIU 102 is adapted to receive and transmit high-level RF signals. Use of such high-level RF signals may not allow for concurrent POTS and Homewires calls. In FIG. 6B, the CIU 102 includes two phone jacks JB and JC in parallel for connection to the wall jack 122. The phone jacks JB and JC connect to a TIP line 300 and a RING line 302. The following components are connected between the TIP and RING lines: a protection circuit 306, a parallel hook detector 308, a ring detector 310, and a carrier current modem 316. The protection circuit 306 protects the CIU 102 from excessive voltages or currents on the TIP and RING lines and filters out high frequency noise. The parallel hook detector 308 detects if any telephone connected to line 130 has been taken off-hook. This includes any non-PIU telephone on the line 130 as well as any PIU-connected telephone which is connected to the line 130 by its associated PIU. When the differential voltage between the TIP line and the RING line is less than 24 volts for a period of several hundred milliseconds (to avoid false triggering by ringing signals and transients), the parallel hook detector 308 drives a signal OFFHOOK high.

The protection circuitry 306, a loop hold circuit 312, a telephone interface transformer 330, a relay contact 328, and a hybrid 314 provide a baseband voice interface between the telephone line 130 and the CIU 102. The relay contact 328, controllable by a SEIZE signal from a microcontroller 340, connects the RING line to the loop hold circuit 312. Assertion of the signal SEIZE causes the relay contact 328 to be closed. When the relay contact 328 is closed, the loop hold circuit 312, which includes a relay, seizes the telephone network line 130 by sinking current to the line 130. As a result, the phone company 134 detects that the line 130 has been seized.

The hybrid circuit 314 separates and combines audio paths RCVAUD and XMITAUD. When the relay contact 328 is closed (that is, the CIU 102 has seized the line), the baseband audio signal on the TIP and RING lines is received by the telephone interface transformer 330 and forwarded to the hybrid 314. The signal XMITAUD is the baseband audio signal from the computer system 100, which is driven by a codec 344 and transmitted through an audio multiplexer 345. The hybrid 314 combines the transmitted baseband audio signal XMITAUD with the received baseband audio signal, then subtracts the transmitted audio signal XMITAUD from the combined audio signal to generate the signal RCVAUD which includes mostly the received audio signal. This combination and subtraction reduces sidetone, and is employed for accurate speech recognition by the speech recognizer associated with the communication software.

The microcontroller includes a status register 352, a Homewires ring counter 354, and a failsafe ring counter 356. The ring detector 310 asserts a signal RINGDET when an incoming ring signal is present on the telephone line 130. The ring counters 354 and 356 decrement from initial values on the rising edge of the RINGDET signal, with the ringing counters 354 and 356 timing out when they count down to zero. The signal RINGDET follows the "envelope" of the ringing pattern, going high when a ring is received and low in between.

The Homewires ring counter 354 monitors the number of rings before the communication software answers an incoming POTS call. The failsafe ring counter 356 determines the number of rings before the microcontroller 340 disables the transmit enable signal XMITENB to shut off the CIU RF carrier, thereby disabling the PIUs and allowing a user to answer the incoming POTS call. The failsafe ring counter 356 ensures that if the communication software becomes inactive for any reason (for example, software hang condition), the PIU-connected telephones will be switched to POTS mode. The Homewires ring counter 354 powers up with the default value of 7.

The microcontroller 340 communicates with the computer system 100 through an integrated UART 342 and a serial port 322. The UART provides full-duplex, serial, asynchronous communications with the computer system 100 (which may occur which may occur at 115.2 kb/s, for example). The microcontroller 340 packetizes digitized audio data into frames for transmission to the computer system 100. In response to a computer query, the microcontroller 340 also packetizes status information for transmission to the computer. Packets received from the computer system 100 are parsed into data and control bytes by the microcontroller 340, with data bytes forwarded to the codec 344 and control bytes responded by CIU firmware running on the microcontroller 340. The firmware is stored in the internal read-only memory (ROM) of the microcontroller 340.

Packets from the computer can be either data packets or command packets. All packets from the UART 342 to the microcontroller 340 are presumed by the microcontroller 340 to be data packets unless the first byte of the packet contains a predetermined value (for example, hexadecimal value FF). Data packets are forwarded by the microcontroller 340 to the digital data input of the codec 344. Thus, if the microcontroller 340 detects a first byte value of FF, the packet information is not passed to the codec; instead, the CIU firmware running on the microcontroller 340 executes the command specified by the command packet. The command packet is loaded into a command queue 358 in the microcontroller 340, which is retrieved by the CIU firmware for execution.

If the transmitted information includes audio data only, then any "FF" data in the stream is replaced by the communication software with another value (e.g., "7F") to avoid mis-identification of a control packet.

If the UART 342 loses synchronization with the computer system 100 for any reason when it receives a stream of serial data from the computer system 100, it maintains the output bytes to the microcontroller 340 to the value FF until the UART 342 is able to re-synchronize. The stream of information following the last FF byte will then be the command information from the computer system 100.

Commands that are issued by the telephone communication software running on the computer system 100 include the following: PC_GetStatus (to retrieve the value of the status register 352); PC_SeizeLine (to cause the microcontroller 340 to assert the signal SEIZE); PC_UnseizeLine (to deassert the signal SEIZE); PC_SetRingRollover (to change the initial value of the Homewires ring counter 354); PC_GoIdle (to cause the CIU to go to an idle state); PC_GoInactive (to cause the CIU to go to an inactive state); PC_HWCallAck (to acknowledge that the communication software has answered the Homewires call); PC_DropCIUCarrier (to stop transmission of the CIU carrier); PC_SetMonitorMode(on) (to inform the CIU 102 that the communication software has started to monitor the line); PC_SetMonitorMode(off) (to inform the CIU 102 that the communication software has stopped monitoring the line); PC_ClearRingTrigger (to reinitialize the fail-safe ring counter 356); and commands to set the time-out parameters of the CUI firmware.

The last byte of the command packet may be a cyclic redundancy check (CRC) byte, which is checked by the microcontroller 340 to determine if the received command packet contains valid information. If the command packet is valid, the microcontroller 340 responds by transmitting status information (including the contents of the register 352) back to the computer system 100 to let the communication software know that the command packet has been received successfully. However, if the microcontroller 340 determines that the command packet information is invalid (for example, due to erroneous bits caused by noise during transmission), the microcontroller 340 does not respond. Each command packet includes a sequence number (e.g., 0 or 1). After a timeout period, if no acknowledgment has been received, the communication software resends the command packet with the same sequence number. If the resent command packet information is valid, the microcontroller 340 responds by sending the status information.

The computer system 100 may also have mistakenly assumed that the microcontroller 340 did not receive the original packet successfully if the status information sent back somehow became corrupted. Accordingly, if the microcontroller 340 sees a command packet with the same sequence number, it will not execute the command again but will retransmit the status information back to the computer system 100.

The CIU firmware will alert the computer system 100 about certain events, which include ring detect (RINGDET active), off-hook event detected (OFFHOOK active), and flash-hook event detected (OFFHOOK pulsed low for less than one second). The CIU firmware will periodically (for example, at 100 ms intervals) send an alert message—CIU__AlertInfo( )—to the computer system 100 until the communication software responds by sending a ReadStatusRegister command to the microcontroller 340.

The microcontroller 340 provides all necessary master, frame and bit clocks to the codec 344. The codec master clock is derived from the microcontroller 340, allowing synchronous generation of codec frame and bit clocks from the microcontroller port pin signals.

The microcontroller 340 includes a caller ID buffer to store any incoming caller ID information. This caller ID information can be presented to the communication software along with an incoming POTS call to notify the user who the caller is.

The CIU firmware includes a flash-hook detector, which monitors the state of the signal OFFHOOK for a flash-hook event. When the signal OFFHOOK is asserted, it indicates a telephone is trying to seize the line 130. A user hitting the flash hook button at the telephone causes the signal OFFHOOK to be pulsed low. To avoid detecting a call-waiting signal as a flash-hook event while a user is on the phone with a n external caller, the CIU firmware includes a timer which times out after a predetermined period of time, for example, five seconds. Before time-out, the CIU firmware will detect a flash-hook event. After time-out, however, the CIU firmware ignores any flash-hook event.

The microcontroller 340 also includes 32-byte transmit and receive buffers to synchronize transfer of information between the UART 342 and the codec 344. The codec provides A/D and D/A conversion of audio signals to and from the computer system 100. For example, the codec 344 may be an 8-bit, 8-kHz, telephony codec. Digital speech data originating at the computer system 100 is passed to the microcontroller 340, then to the codec 344 for D/A conversion and smoothing. The codec 344 then transmits the output signal as XMITAUD through the 1 and 2 inputs of the audio multiplexer 345. The 0 input of the audio multiplexer 345 is tied low, and its select inputs are connected to signals AUDSELA and AUDSELB. The states of the signals AUDSELA and AUDSELB are controlled by the CIU firmware, with the signal XMITAUD (discussed below) being transmitted only when a Homewires call is not in progress (that is, when AUDSELA, AUDSELB have binary values 01 and 10).

The output signal from the codec 344 is also provided to the input of an amplifier 350, which generates a signal MODAUD provided to the carrier current modem 316 to frequency modulate the CIU RF carrier onto the telephone line 130.

Incoming speech from an audio multiplexer 346 is provided to an amplifier 348, which then provides the incoming data to the analog data input of the codec 344. The codec 344 bandlimits (for example, 200 to 3400 Hz) and digitizes the incoming speech data, then passes it to the microcontroller 340 to output to the computer system 100. The audio multiplexer 346 selects one of three audio sources, based on the state of the signals AUDSELA and AUDSELB, for digitization by the codec 344: a demodulated PIU RF signal DEMOD from the(carrier current modem 316; POTS voice data RCVAUD from the hybrid 314; and a MONITOR signal from the carrier current modem 316 which monitors voice data on the telephone line 130 without having to seize the line 130.

The microcontroller 340 monitors the state of the following signals: the carrier detect signal CXD__from the carrier current modem 316; the OFFHOOK signal from the parallel hook detector 308; and the ring detect signal RINGDET from the ring detector 310. The microcontroller 340 generates the following signals: a signal XMITENB to the carrier current modem 316 to enable the CIU RF carrier onto the telephone line 130; and the signal SEIZE to seize the line 130.

The carrier current modem 316 modulates and demodulates audio signals and controls bi-directional communication between the computer system 100 and the PIU-connected telephones. The carrier current modem 316 may include a voltage-controlled oscillator (VCO) that is frequency modulated by a signal MODAUD (the baseband analog signal from the computer system 100 through the codec 344). The center of frequency of the VCO 800 may be at 310 kHz, for example. Output driver circuitry is enabled when the signal XMITENB is asserted by the microcontroller 340 to generate a CIU RF carrier over the telephone line 130. The modem 316 may also receive a signal RINGMOD from the microcontroller to generate a special modulated carrier on the telephone line 130 to activate chirp ringers in the PIUs.

On the receiving direction, a received PIU RF carrier may pass through a bandpass filter to a demodulator in the modem 316. The demodulator produces the output voltage signal DEMOD proportional to the input carrier's deviation from the center frequency.

A PIU RF carrier detector in the modem 316 drives the signal CXD__low in response to detection of a PIU RF carrier. The signal CXD__being low notifies the microcontroller 340 that a PIU-connected telephone has been taken off-hook and a PIU RF carrier has been detected. A line MONITOR signal, which is provided to the audio multiplexer 346, allows the CUI 102 to monitor baseband voice data on the telephone line 130 without the CIU 102 having to go off-hook. This allows the CIU 102 to monitor POTS calls for instructions to go off-hook and participate in the POTS call as described below.

Referring again to FIG. 6B, the signals CXD__, OFFHOOK, RINGDET, SEIZE, XMITENB, and the current state CIUSTATE[1:01 of the CIU firmware are stored in the status register 352 of the microcontroller 340. When the communication software issues the command PC__GetRingRollover to the microcontroller 340, the count of the Homewires ring counter 354 is retrieved. If the command PC__GetStatus is issued, the contents of the status register 352 are sent back to the computer system 100 in the form of a CIU__Status packet.

If high-level RF carriers are used, the microcontroller 340 also clears the signal XMITENB when a telephone is taken off-hook. The reason for this direct hardware clearing is to ensure that the CIU RF carrier is not placed on the telephone network line 130 during normal telephone operation which then avoids violating FCC or other governmental requirements. If a low-level RF carrier is used, this clearing feature is not needed.

The microcontroller 340 asserts the SEIZE signal, closing switch 328, to cause the CIU 102 to seize the telephone network line 130, which will result in a local off-hook detect and which will also clear the XMITENB bit.

Thus, the communication protocol between the PIUs and the CIU 102 in the telephone system of FIG. 1 includes the following information: off-hook/on-hook indication (line bias voltage); ring detect indication (ringing signal on the telephone line 130); PIU carrier present indication; and CIU carrier present indication. A line bias voltage less than about 24 volts for a predetermined period (for example, several hundred milliseconds) indicates that a telephone on the line 130 is off-hook. Otherwise, if the line bias voltage does not satisfy this condition, then all the telephones are on-hook in the telephone network.

The ring detect indication is true if the telephone line 130 has an oscillating voltage having a frequency within the range from about 15 to 68 Hz and an amplitude above about 50 volts. The CIU carrier is present if an RF carrier signal is present which is centered at a first frequency (for example, 310 kHz) and has an amplitude greater than about 4 volts (for a high-level RF system). The PIU carrier present indication is true if an RF carrier signal is present which is centered at a second frequency (for example, 485 kHz) and has an amplitude greater than about 4 volts. The channel for both the PIU and CIU carrier signals is about 20 Hz, for example, although a different channel width can be used.

COMPUTER INTERFACE UNIT FIRMWARE

Figure 8:
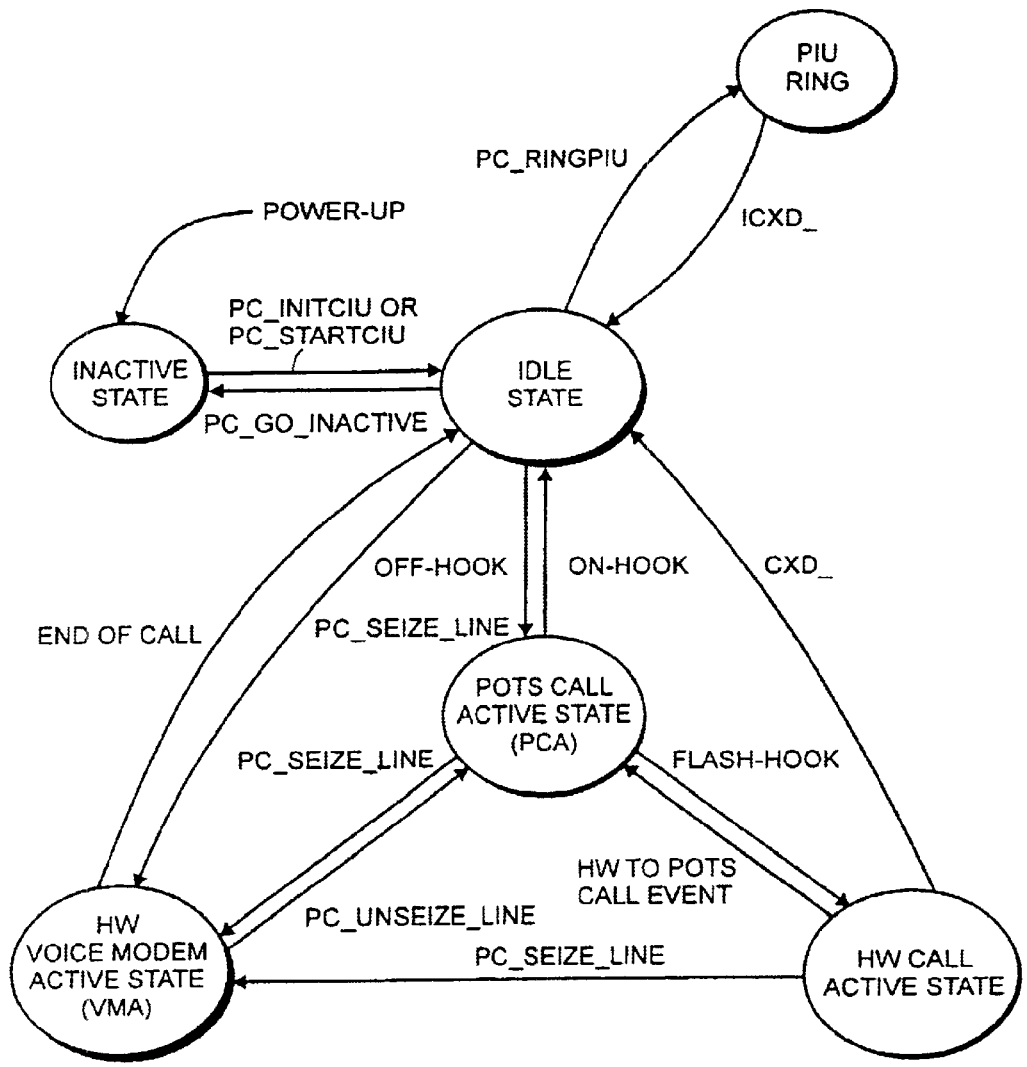
FIGS. 8, 9A–9B are state diagrams of firmware running on the computer interface unit of FIG. 6.
Figure 9A:
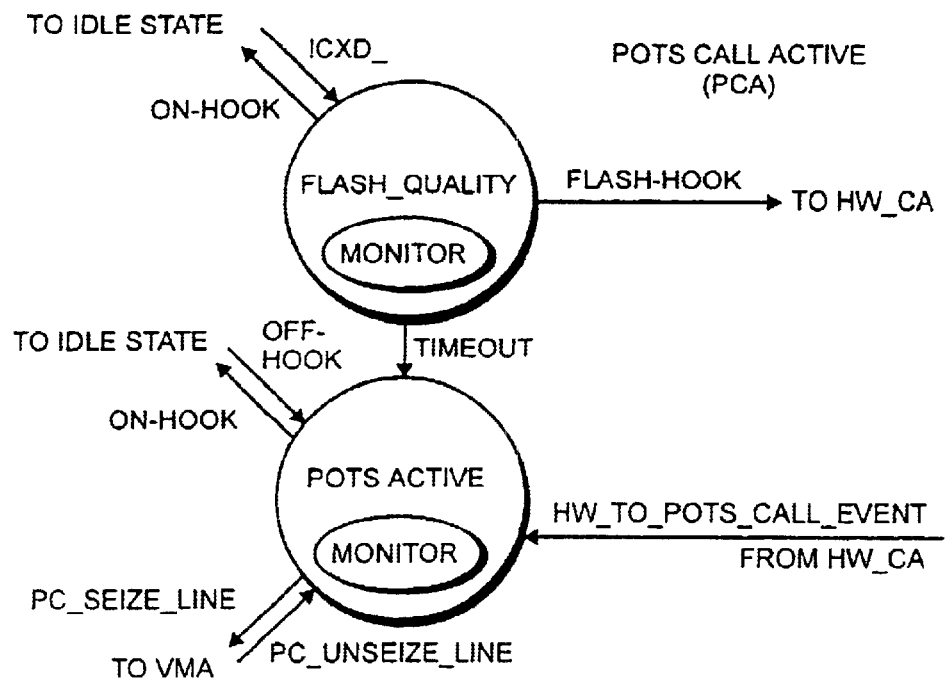
Figure 9B:
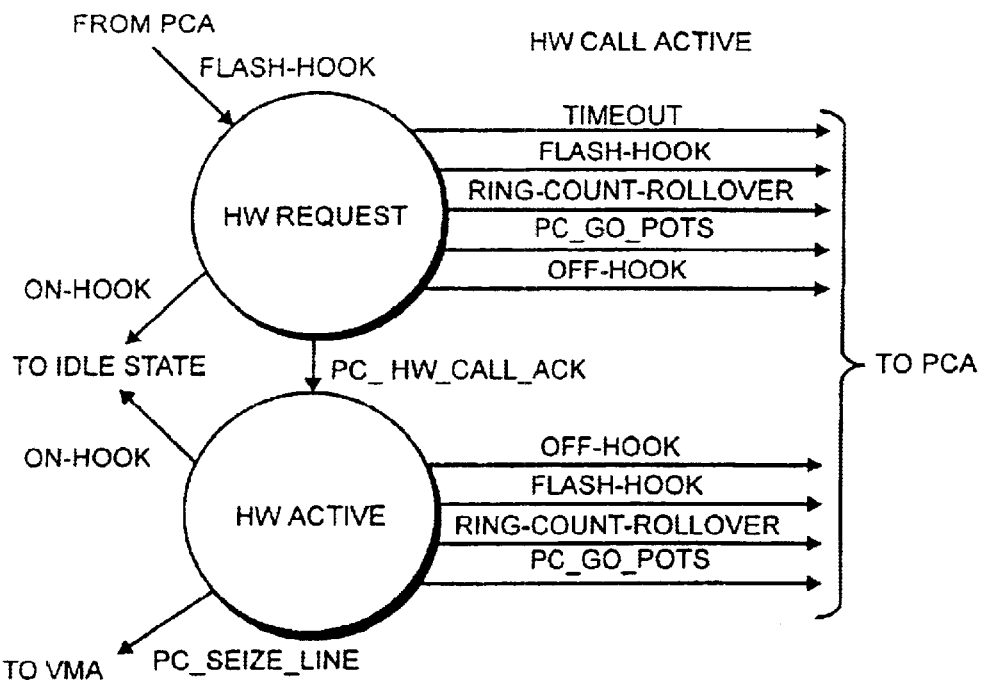

Referring to FIGS. 8, 9A–9B, a state diagram shows the function of the CIU firmware running on the microcontroller 340 in FIG. 6B. The behavioral modes of the CIU 102 correspond to the operational modes of the communication software running in the computer system 100. The CIU firmware powers up in an Inactive state in which the telephone system behaves as a POTS system. The CIU firmware has 5 active states: Idle, HWCallActive, HWVoiceModeActive, PotsCallActive, PIURing. The PotsCallActive state includes two sub-states: PotsActive and FlashQualify. The HWCallActive state, also has two sub-states: HWRequest and HWActive. The CIU firmware remains in the Inactive state while the communication software in the computer system 100 remains inactive. In the Inactive state, the signal XMITENB is asserted by the microcontroller 340 to the carrier current modem 316, which places the 310-kHz RF carrier on the telephone line 130 for the purpose of charging the PIUs in one embodiment.

When the telephone communication software is powered on, it issues a PC_InitCIU command to the microcontroller 340 through the serial port 322 to establish a communication link with the CIU 102. This causes the CIU firmware to transition to the Idle state, in which the CIU firmware waits for one of several events to occur. The communication software can also transmit a PC_StartCIU command to establish the communication link. In the Idle state, the signal XMITENB is maintained high to enable the CIU carrier. When the communication software in the computer system shuts down, a command PC_GoInactive is transmitted, causing the CIU firmware to transition back to the Inactive state.

Receipt of a network phone call over the network 12 is indicated by an indication PC_RingPIU from the communication software in the computer 100. This causes the firmware to transition from the Idle state to a state PIURing, in which the signal RINGMOD is activated by the microcontroller in FIG. 6B to cause generation of the special carrier to ring the PIU ringers. The CIU firmware then returns to the Idle state after the user picks up, which may be indicated by the presence of a PIU carrier as indicated by the signal CXD_.

In the Idle state, if a non-PIU telephone is taken off-hook (the signal OFFHOOK is asserted but the signal CXD_is not), the CIU firmware transitions to the PotsActive sub-state of the PotsCallActive state. The signal XMITENB is shut off.

If a PIU-connected telephone is taken off hook, the signal CXD_is asserted by the carrier current modem 316. The CIU firmware responds by deasserting the signal XMITENB to switch the PIUs to mode 1 (pass-through state) and transitioning to the FlashQualify sub-state, in which the firmware waits a predetermined period of time (for example, 5 seconds) for a flash-hook event to be received. If no flash-hook event is received before time-out, the firmware transitions to the PotsActive sub-state. Typically, the user will issue a flash-hook within a short time of picking up the PIU-connected telephone. If not, the time-out period ensures that call-waiting during a POTS call does not falsely trigger the firmware to enter into Homewires call mode.

In the FlashQualify sub-state, if a flash-hook event is detected (the signal OFFHOOK is pulsed low for less than one second), the CIU firmware transitions to the HWRequest sub-state of the HWCallActive state. The communication software detects the flash-hook condition and responds accordingly. If the communication software responds within a time-out period (for example, 10 seconds) with an PC_HWCallAck command, the CIU firmware transitions from the HWRequest sub-state to the HWActive sub-state, in which the microcontroller 340 maintains the signal XMITENB asserted to cause the CIU RF carrier to switch the PIU to mode 2. However, if the 10-second timeout occurs, the CIU firmware transitions to the PotsActive sub-state, causing the microcontroller 340 to maintain the signal XMITENB negated.

In the PotsCallActive state, the signals AUDSELA and AUDSELB are driven to a state to select the signal MONITOR at the audio multiplexer 346. This allows the computer system 100 to listen in on the POTS call. The computer system 100 can then be instructed to seize the telephone line 100A and provide services to the local or remote call participants.

From the HWRequest sub-state, the CIU firmware can also transition back to the PotsActive sub-state if any one of the following occurs: the user has issued another flash-hook; the failsafe ring counter 356 in the microcontroller 340 expires after the predefined number of incoming rings; the command PC_GoPots is received from the communication software (for example, in response to a user command to seize the line); or if high-level RF carriers are used and if the signal OFFHOOK is true (that is, either a non-PIU telephone is taken off-hook or another PIU-connected has been taken off-book and the 5 second timer in the PIU expired).

In the HWActive sub-state, the signals AUDSELA and AUDSELB are both set low to select the demodulated signal DEMOD at the audio multiplexer 346. In addition, the signal XMITENB is maintained asserted to perform a full-duplex voice communication between the computer system 100 and the PIU-connected telephone via the codec 344 and the carrier current modem 316. If a non-PIU telephone is lifted or a PIU-connected telephone is lifted and five seconds have elapsed (OFFHOOK asserted high), the CIU firmware transitions to the PotsActive sub-state, causing the CIU carrier to be disabled to revert the telephone system back to POTS behavior.

In the HWActive state, if the user decides to issue a command to place an outside call or to answer an incoming call on the POTS line, the communication software responds by issuing a PC_GoPots command, which causes the CIU firmware to transition from the HWActive sub-state to the PotsActive sub-state.

When an incoming ring on the POTS line is received while the CIU firmware is in the HWActive sub-state, the communication software can notify the user who the calling party is based on the caller ID information. If the user and communication software do nothing (for example, software hangs) and the failsafe ring counter 356 expires, the firmware also transitions back to the PotsActive sub-state, where the signal XMITENB is disabled to allow the user to answer the call from a PIU-connected telephone. An incoming call can also be received over the network 12, in which case the communication software can also notify the user of the network phone call. The CIU firmware remains in the HWActive sub-state.

If the telephone communication software is instructed to connect the incoming POTS call, it issues the command PC SeizeLine, which causes the CIU firmware to transition from the HWActive sub-state to the HWVoiceModemActive state. In this state, the microcontroller 340 asserts the signal SEIZE to seize the telephone line 130 to create a baseband link from the codec 344 to the telephone line 130. This allows an outside caller to talk with the voice mail in the computer system 100 as well as to allow the computer system 100 to dial an out-going number by sending a DTMF tone data through the codec 344 to the telephone line 130. After the telephone communication software has completed the POTS call, it issues the PC_UnseizeLine command, which causes the CIU firmware to transition from the HWVoiceModemActive state to the PotsActive sub-state. From the PotsActive sub-state, if the user hits flash-hook again within the five-second time-out window, the CIU firmware transitions back to the HWActive sub-state to continue the Homewires call.

From the HWCallActive state, the CIU firmware transitions back to the Idle state if the signal CXD_is deasserted to indicate the user has hung up. In the HWCallActive state, the PIUs handle the situation in which another PIU-connected telephone is picked up while a Homewires call is active. The second user initially obtains a busy tone from the picked-up PIU. After the time-out period (for example, 5 seconds), the second PIU goes off-hook (as described with respect to FIG. 5B), which causes the CIU 102 to detect assertion of the OFFHOOK signal. The CIU firmware then cuts off the CIU carrier to place the original telephone in POTS mode, and the CIU firmware transitions back to the Idle state.

In addition, in the PotsCallActive state, the CIU firmware monitors the state of the signal OFFHOOK to determine when all the telephones have gone on-hook and the POTS call has ended. If so, the CIU firmware returns to the IDLE state.

In the Idle state, the microcontroller 340 reports incoming POTS rings to the computer system 100. If the Homewires ring counter 354 expires, the communication software may command the CIU 102 to seize the line 130 with the PC_SeizeLine command,.thus allowing the computer system 100 to provide voice mail and other services to the caller. If this happens, the CIU firmware transitions to the HWVoiceModemActive state, in which all voice data from the remote caller are transmitted by the codec 344 through the microcontroller 340 to the computer system 100. In the HWVoiceModemActive state, the signals AUDSELA and AUDSELB are set high and low, respectively, to select the received baseband signal RCVAUD at the audio multiplexer 346. Once the remote telephone call has ended (for example, the firmware detects a dial tone), the microcontroller 340 sets a dial-tone detect flag and the CIU firmware returns to the Idle state.

In the Idle state, if the communication software does not respond to an incoming call, then only the ringing status is passed to the communication software. Nothing happens until the failsafe ring counter 356 expires, as described above, or a user picks up a telephone, which causes the CIU firmware to transition to the PotsCallActive state.

Firmware running on the controller 360 in the FIG. 6A embodiment may be similar to the firmware running on the FIG. 6B embodiment except that the controller 360 is also capable of handling simultaneous Homewires and POTS calls.

TELEPHONE COMMUNICATION SOFTWARE

Figure 10:
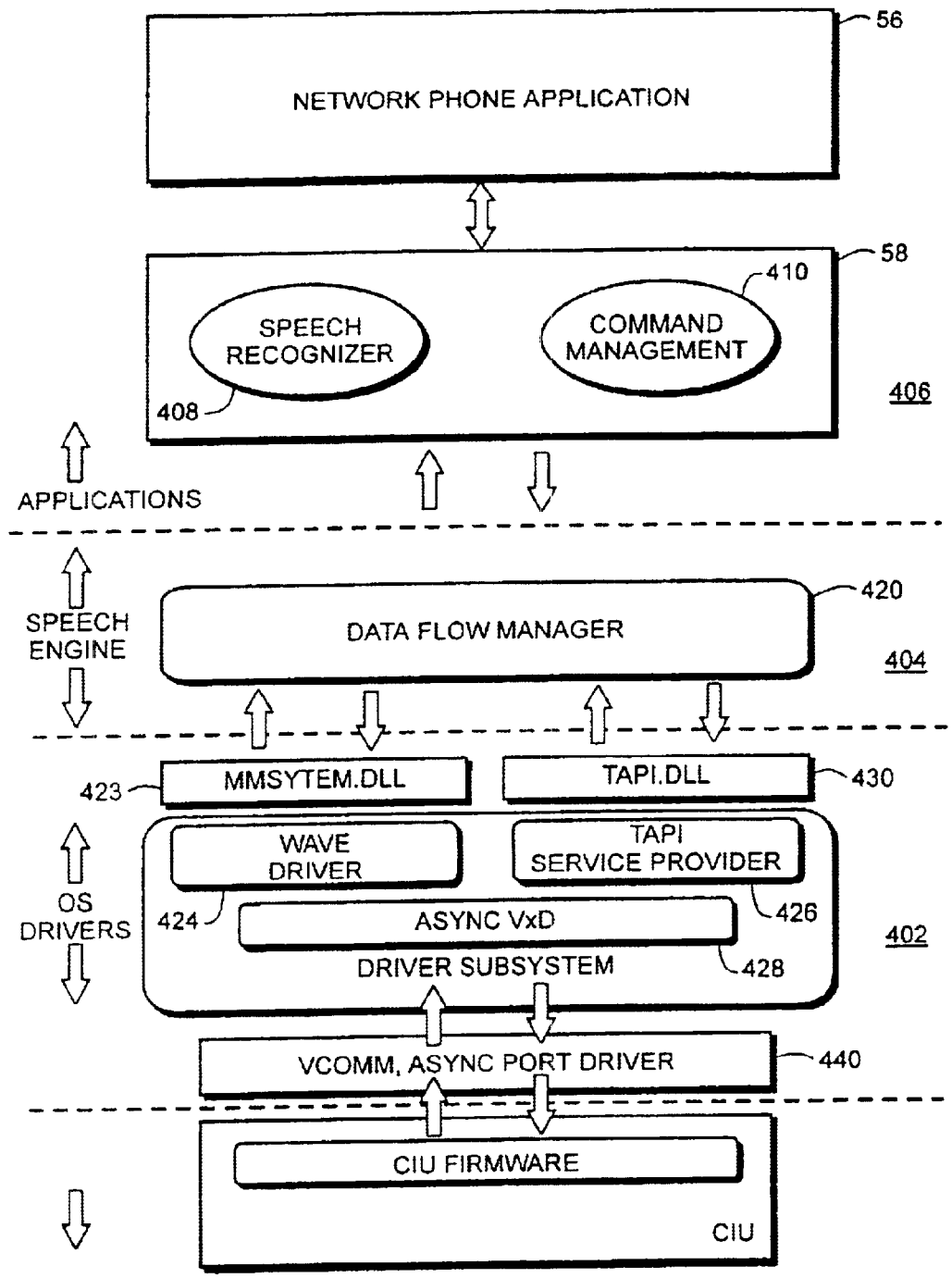
FIG. 10 is a block diagram of layers in the communications software running in the computer system of FIG. 1.

Referring to FIG. 10, the telephone communication software according to one embodiment in the computer system 100 can be thought of as having several layers or levels, which include the applications layer 406, the speech engine layer 404, and the operating system driver layer 402. A fourth layer of the telephone communication software can be thought of as including the CIU firmware. The highest level includes the applications level 406, which includes the general Homewires application 58 and the network phone application 56. The general Homewires application 58 may include a speech recognizer program 408 and a command management program 410 for performing tasks in response to commands recognized by the speech recognizer program 408. Voice data received and recognized by the speech recognizer program 408 are converted into corresponding commands issued to the command management program 410.

The command management program 410 provides such functions as voice mail, voice e-mail, fax, voice dialing, and address book management. The command management program 410 includes speech control scripts for controlling the "discourse" conversation with a user on a telephone (connected to the telephone network line 130 or remotely connected to the external phone line 128). The scripts are started by one of two types of events: an incoming phone call or an event generated by an application running on the computer system 100. The scripts determine how the computer system 100 interacts with the user, and what applications/activities are to take place in the computer system 100 in response to user commands.

The speech recognizer 408 and command management program 410 communicates with the CUI firmware through a data flow manager 420, the operating system driver layer 402, a serial port device driver VCOMM 440, and the serial port 758.

A third layer in the communication software is the speech engine 404, which includes the data flow manager 420. The data flow manager 420 responds to telephony application programming interface (TAPI) events and uses the standard multimedia control interface (MCI) wave driver provided by the operating system (for example, Windows ® 95 or 98). Further, the data flow manager 420 notifies the OS driver layer 402 whether it is monitoring the communications line, that is, whether it is interested in receiving events from the CIU firmware.

Another layer in the telephone communication software is the operating system drivers layer 402, which includes a set of operating system-compatible drivers (such as those supplied with the Windows ® operating system). The drivers include a TAPI service provider (TSP) 426 for call control, the wave file driver 424 that meets the MCI standard for digitized voice control, and an async virtual device driver (VxD) 428 that accesses and controls the asynchronous port to the CIU 102.

In one embodiment, buffers 68 (FIG. 22) between the wave audio driver 424 and network phone application 56 can store a predetermined amount (e.g., 2,000 bytes) of audio data during a regular Homewires conversation between a user and the telephone communication software. However, when a network phone call is in progress, the size of the buffers may be reduced, such as to 232 bytes. The transmitted audio data are temporarily stored in the buffers, with the audio data transmitted sequentially to provide a continuous stream of data.

According to one embodiment, the wave file driver 424 may be built according to standard multimedia system wave input (WIDM) and wave output (WODM) API specifications provided by Microsoft Corporation. Output data, converted in the manner described above, is passed to the device object 436 and asynch VxD 428, which then transmits the audio data stream to the CIU 102 in the order of delivery. CIU command packets may be merged into the outgoing stream of audio data.

Data received by the asynch VxD 428 is presumed to be audio data unless preceded by a predetermined value (such as "FF") to denote a control packet. The received audio data is passed by the asynch VxD 428 to the wave file driver 424 for conversion before it is supplied to the device object 436 and forwarded by an audio driver to the standard MMSYSTEM.DLL interface 423 provided by Microsoft Corporation. The MMSYSTEM.DLL interface 423 transmits the data to the application program layer 406. The TAPI service provider (TSP) 426 translates the control signals from the CIU 102 into behavior that mimics a standard telephone line. The TSP 426 is also capable of supporting 2 simultaneous calls (a standard plain old telephone service or POTS phone call and a Homewires call) on a single line. Another feature of the TSP 426 is its ability to debounce signals passed by the async VxD 428. By using the TSP 426 to emulate some of the hardware functions, hardware complexity is reduced which results in cost savings. Alternatively, such features can be implemented in the CUI firmware.

TAPI SERVICE PROVIDER

Figure 11:
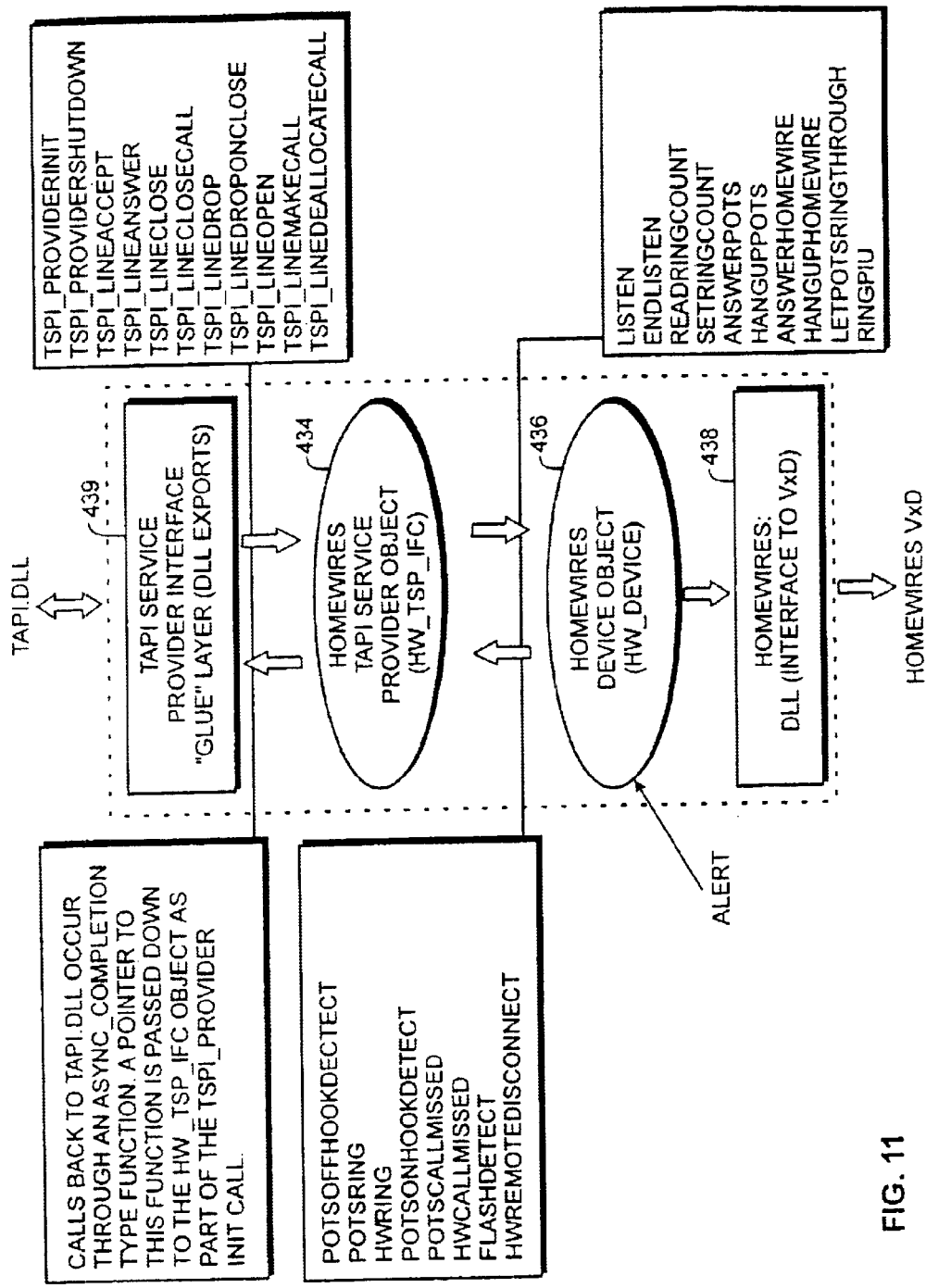
FIG. 11 is a block diagram of the layers in a Telephony Application Programming Interface (TAPI) service provider in the communications software of FIG. 10.

Referring to FIG. 11, the TSP 426 is divided into three layers: a TAPI service interface (HW_TSP_IFC) object 434, a device (HW_DEVICE) object 436, and a VxD interface DLL 438. The HW_TSP_IFC object 434 is called by a TAPI.DLL file 430 and implements TAPI calls. The TAPI.DLL file is a Windows library of functions specific to the telephony application programming interface.

The TAPI.DLL 430 receives calls from the command management program 410 (through the data flow manager 420) and parses the calls into commands issued to the TSP 426 through a TSP glue layer 439. The available commands are set forth in the Telephony Application Programming Interface Specification published by Microsoft Corporation, which is hereby incorporated by reference. A TAPI.DLL command is prefixed by "TSPI" in the ensuing description. The TSP 426 communicates with the TAPI.DLL 430 through an ASYNC_COMPLETION type function, with the pointer to the function passed down to the HW_TSP_IFC object 434 as part of a TSPI_ProviderInit call (issued when the TAPI.DLL 430 initially powers up).

The TSP 426 provides call progress monitoring and information for a POTS call through the HW_TSP_IFC object 434. This allows the computer system 100 to monitor POTS calls without the CIU 102 going off hook, even if they are made from a non-PIU telephone. The monitored voice data is received through the MONITOR line from the carrier current modem 316.

The HW_DEVICE object 436 sits below the HW_TSP_IFC object 434. The HW_DEVICE object 436 translates Homewires call control signals (including POTS signals) into TAPI events for the HW_TSP_IFC object 434, and provides the interface to the async virtual device driver (VxD) 428 through the async VxD DLL 438. The events include: PotsOffHookDetect (a telephone is off-hook and conducting a POTS call); HWRing (a Homewires ring is detected); PotsRing (an incoming ring signal is detected); PotsOnHookDetect (the POTS telephone has hung up); PotsCallMissed (an incoming POTS call was detected by the CUI 102 but the outside caller hung up before the communication software could answer); HWCallMissed (a PIU carrier was detected but the PIU-connected telephone was hung up before the communication software could respond); FlashDetect (a flash-hook is detected); and HWRemoteDisconnect (a remote disconnect event has occurred). Since the events received follow signals from the CIU 102, the HW_DEVICE object 436 conditions the signals to provide more telephone-like behavior and to debounce the signals to remove noise components, such as those due to ringing and transient spikes. For example, when the HW_DEVICE object 436 sees a carrier detect, and no Homewires call is in progress, it generates a standard periodic phone ringing event HWRing to the HW_TSP_IFC 434. In addition, the signals transmitted from the CUI firmware through the async VxD 428 tend to be "bouncy" or noisy, since a hardware debouncer is not included in the CIU 102. The HW_DEVICE object 436 includes a state machine which debounces any transient spikes or ringing in an incoming signal. By implementing these features in the device driver software, that is, the HW_DEVICE object 436, rather than in hardware on the CIU 102, hardware complexity may be reduced. Further, reliability is improved as there are fewer hardware components which are subject to failure.

Defined under the HW_TSP IFC object 434 are the following public methods. A method HW_NETWORK IFC( ) constructs a new HW_TSP_IFC object 434 and initializes the object's data structures. A method -HW_NETWORK IFC( ) destroys the current HW_TSP_IFC object 434. If the HW_TSP_IFC object 434 is currently connected to the line when -HW_NETWORK_IFC( ) is issued, it first notifies the HW_DEVICE object 436 to disconnect the line, and then calls the appropriate commands to shut down call-back processing from the VxD interface DLL 438.

The HW_TSP_IFC object 434 also supports line/device control public methods which are processed by the HW_DEVICE object 436. The methods include the following: RingPIU (ring PIUs on the telephone line 130 to indicate receipt of a network phone call); Listen (start monitoring and reporting line events); EndListen (stop monitoring and reporting line events); AnswerHomewire (answer Homewires call from a PIU-connected telephone); HangUpHomewire (hang up active Homewires call); AnswerPots (seizes the line to answer POTS call); HangUpPots (hang up current POTS call); SetRingCount (set the initial value of the Homewires ring counter 354 in the microcontroller 340); ReadRingCount (read the value of the Homewires ring counter 354);. and LetPotsRingThrough (set the Homewires ring counter 354 to the value 1 to allow subsequent rings to come through immediately).

In more detail, the method Listen notifies the HW_DEVICE object 436 to monitor the line for status changes, which includes establishing the connection to the VxD interface DLL 438 and initializing polling of the CIU 102 by the async VxD 428. The method EndListen stops the line monitoring process. The method SetRingCount (NUMRINGS) sets the allowed number of rings to allow before the CIU 102 switches to baseband, that is, seizes the line to pick up the external call.

Another layer in the TSP 426 is the VxD interface DLL 438, which is an interface layer between the HW_DEVICE object 436 and the async VxD 428. The VxD DLL 438 provides call-back processing through which the async VxD 428 can report status changes and command completion events. The VxD DLL 438 provides a hidden window to which VxD messages are sent. The call-back procedure in the VxD DLL 438 DLL must remain resident in memory to prevent events from the async VxD 428 from trashing other system resources.

Effectively, the VxD interface DLL 438 provides a C interface to the async virtual device driver VxD 428. The TAPI.DLL file 430 creates a special 16-bit process from a program TAP132.EXE to act as an application context in which the TSP 426 can make various Windows calls. A "single" application context (the one created by TAPIEXE.EXE) remains alive between the initialization/shutdown paired call to the TSP 426.

The VxD interface DLL 438 uses the process created by TAPIEXE.EXE to create a call-back window to enable the VxD interface DLL 438 to receive status change messages. The creation and destruction of this window are handled entirely within the VxD interface DLL 438 itself. If the VxD interface DLL 438 receives a command HW_RegisterServerProcess (HW_TSPCALLBACK CallBackAddress), which is issued by the HW_TSP_IFC object 434 upon initialization, the VxD interface DLL 438 registers the current Windows process as the server process for the VxD interface DLL 438. The command includes a call-back address to a portion of the memory 734 (FIG. 7) to which the async VxD 428 can report asynchronous messages, including status change alerts from the CIU 102. This provides asynchronous event processing for the TSP 426. A command HW_RemoveServerProcess( ) removes the current process as a server process for the VxD interface DLL 438.

Based on the messages posted to the call-back window, the TAPIEXE.EXE routine calls the TSP 426 to handle the events posted.

TSP DEVICE OBJECT

Figure 12:
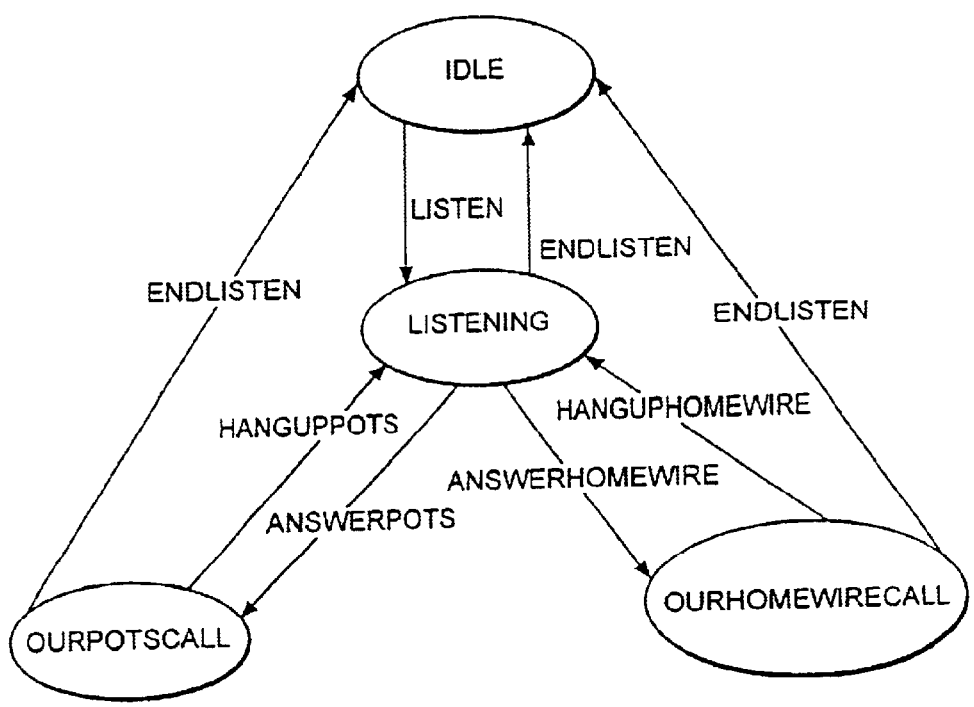
FIG. 12 is a state diagram of a device object in the TAPI service provider of FIG. 11.

Referring to FIG. 12, the HW_DEVICE object 436, described in greater detail, includes a state machine that can be in one of four states: Idle; Listening; OurPotsCall; and OurHomewireCall. The behavior of the HW_DEVICE state machine is controlled by methods called by the HW_TSP_IFC object 434. The HW_DEVICE state machine starts out in the Idle state. If the HW_DEVICE state machine receives the Listen method from the HW_TSP_IFC object 434, it transitions to the Listening state where it awaits a command from the HW_TSP_IFC object 434 to pick up a POTS call (AnswerPots), pick up a Homewires call (AnswerHomewire), or transition back to the Idle state (EndListen). If the HW_DEVICE state machine receives the AnswerPots method in the Listening state, it transitions to the OurPotsCall state, where the TSP 426 takes the POTS call. In the OurPotsCall state, if a HangUpPots method is received, the HW_DEVICE state machine transitions back to the Listening state.

If the HW_DEVICE state machine receives a Answer-Homewire method from the HW_TSP_IFC object 434 in the Listening state, the state machine transitions to the OurHomewireCall state, where the TSP 426 handles a Homewires call. The method HangUpHomewire causes the state machine to transition back to the Listening state.

If the HW_DEVICE state machine receives the method EndListen from any state, it returns back to the Idle state where it stops monitoring the communication line for either POTS or Homewires calls.

Figure 13:
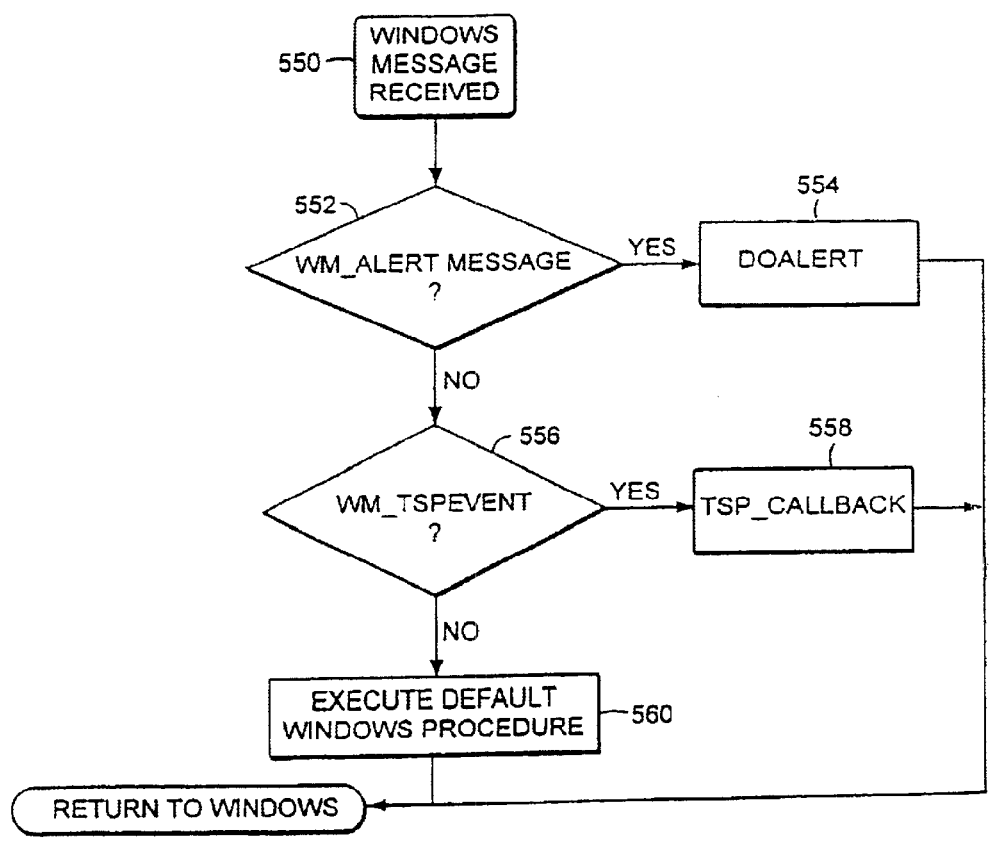
FIG. 13 is a flow diagram of a routine in the device object of FIG. 12.

Referring to FIG. 13, the HW_DEVICE object 436 includes a "hidden window" main routine that handles messages posted to the call-back window by the async VxD 428. One of the messages is a Windows alert (WM_Alert) event, which occurs when the async VxD 428 posts a message to the call-back window. If the hidden window main routine receives, at 550, a Windows message, it checks, at 552, to determine if a WM_Alert event is received. If so, the hidden window main routine executes, at 554, a DoAlert routine, which reads the call-back window for new status information posted by the async VxD 428. In response to the posted messages, if the HW_TSP_IFC object 434 needs to be notified, the DoAlert routine sends a notification message to the HW_TSP_IFC object 434 by posting a TAPI event to the hidden window (WM TSP event). At a later time, the hidden window main routine will call the HW_TSP_IFC object 434 to service the posted event.

The DoAlert routine serves as a "one-message delay" buffer for events that must bubble up to the HW_TSP_IFC object 434. Thus while the DoAlert routine is handling the alert message from the async VxD 434, it holds off handling of any WM_TSP event it posts. If the DoAlert routine calls the HW_TSP_IFC object 434 to handle the WM_TSP event, the HW_TSP_IFC object 434 may need to loop back and send a method down to the HW_DEVICE object 436 in response. If that happens, then processing of the WM_TSP event will interfere with processing of the WM_Alert event. Thus each message is processed completely and control returns to Windows before the HW_DEVICE object processes another message.

If the hidden window main routine receives, at 556, a WM_TSP event, the main routine executes, at 558, the TSP_CallBack routine, which calls the HW_TSP_IFC object 434 to handle the posted event.

If the received Windows message is not a WM_Alert event or a WM_TSP event, then the hidden window main routine invokes, at 560, the default Windows procedure to handle the event before returning to Windows.

Figure 14:
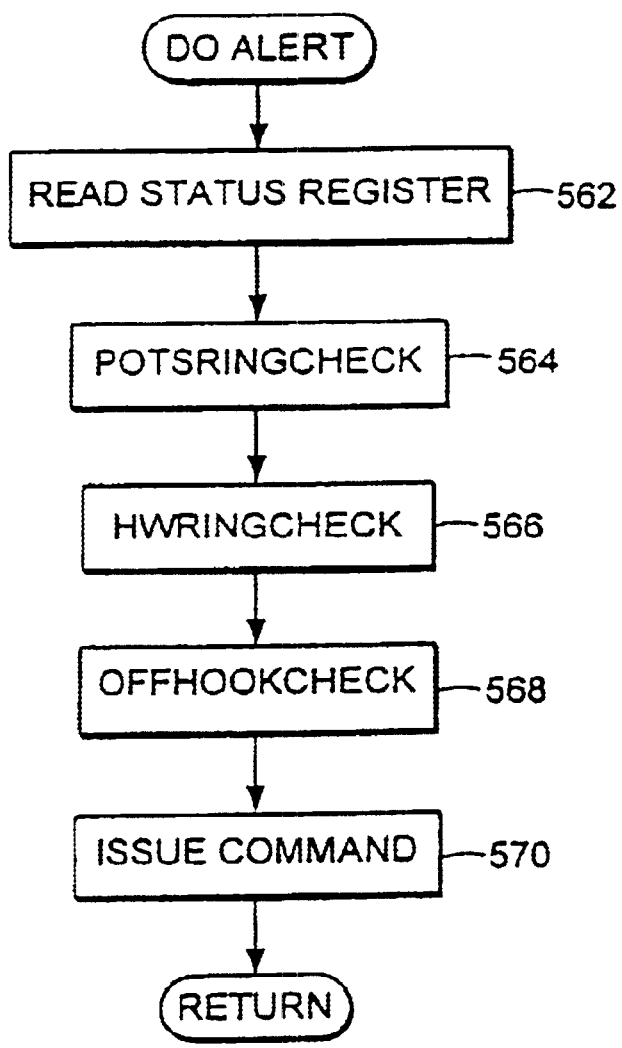
FIG. 14 is a flow diagram of a alert subroutine in the device object of FIGS. 12 and 13.

Referring to FIG. 14, the DoAlert routine called by the hidden window main routine is described in greater detail. The DoAlert routine first issues, at 562, a ReadStatusRegister command for reading the current status, which is in the form of the status packet CIU_Status stored by the async VxD 428. The CIU_Status packet is the contents of the status register 352 transmitted to the async VxD 428. Next, the DoAlert routine executes, at 564, a PotsRingCheck routine to check if the status register 352 is indicating a received ring signal. If the PotsRingCheck routine detects that the received ring is not a false ring, it issues a PotsRing event to the call-back window for processing by the HW_TSP_IFC object 434.

The DoAlert routine next executes, at 566, an HWRingCheck routine to determine if a Homewires ring is detected (that is, a PIU-connected telephone is offhook). If the HWRingCheck routine determines that the Homewires ring is not a false ring, it posts the HWRing event to the call-back window. Next, the DoAlert routine executes, at 568, a routine OffHookCheck to determine if a telephone has been taken offhook on the telephone line 130. The OffHookCheck routine issues an Off look event, an OnHook event, or a Flash Detect event depending on when the off hook status is detected, as discussed in FIG. 17 below. Finally, the DoAlert routine issues, at 570, a command to the CIU firmware based on the current state of the HW_DEVICE object 436.

Figure 15:
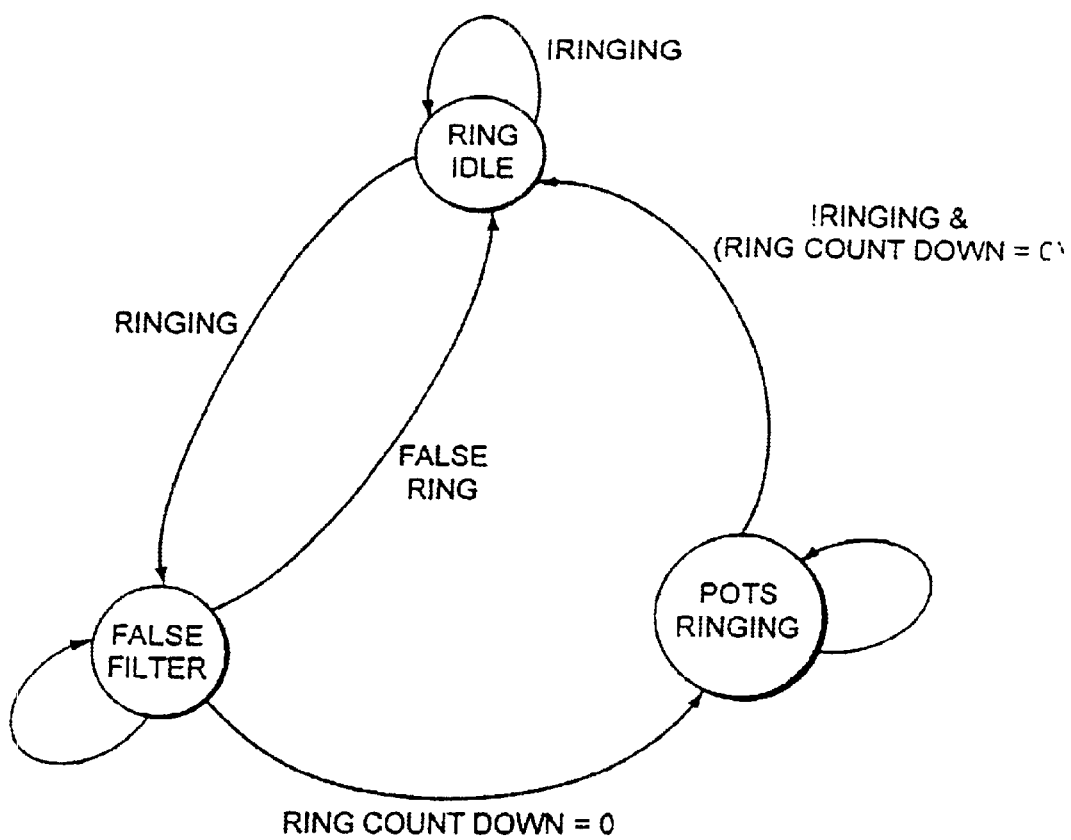
FIGS. 15, 16, and 17 are state diagrams of subroutines called by the alert subroutine of FIG. 14.
Figure 16:
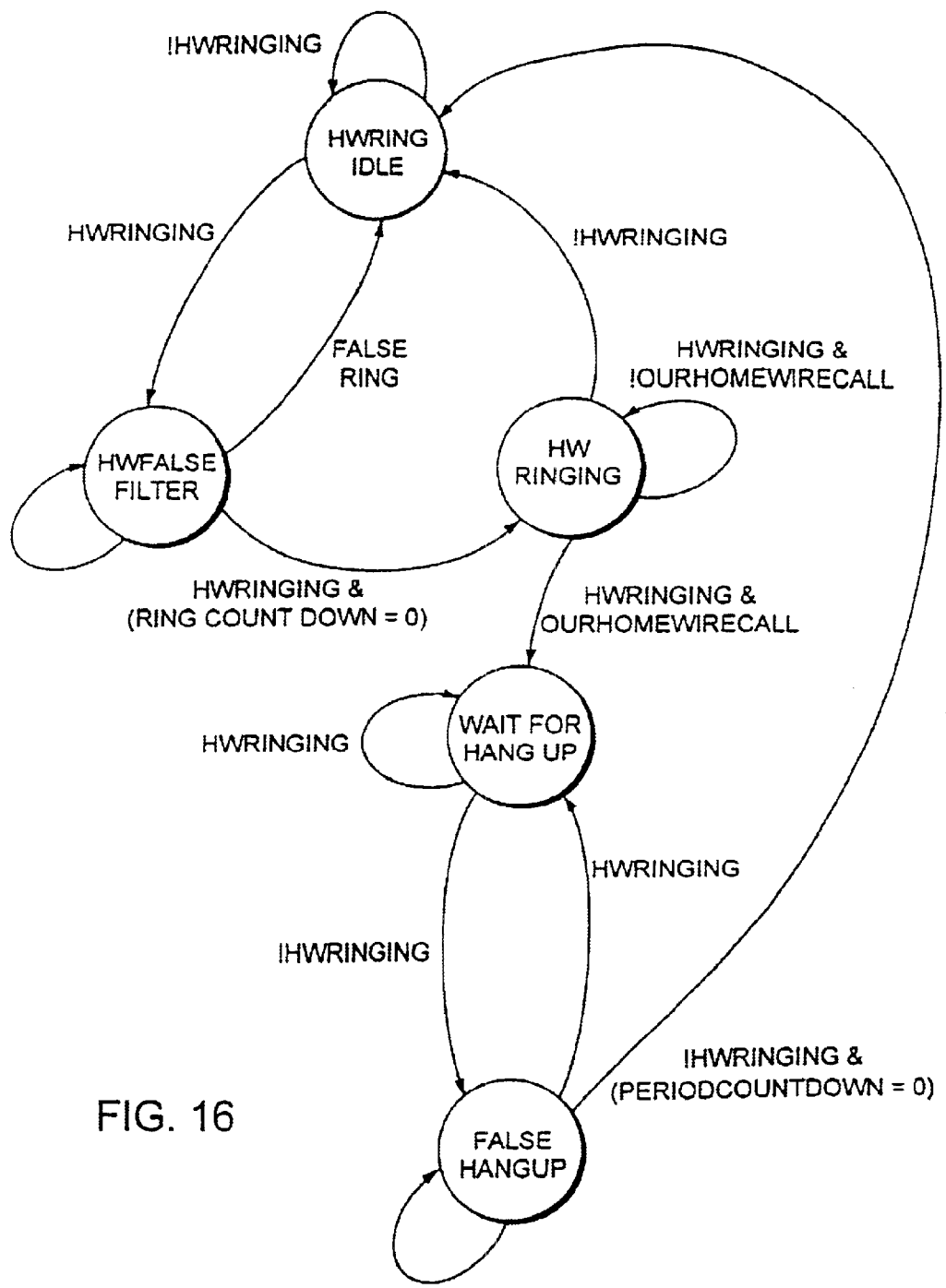
Figure 17:
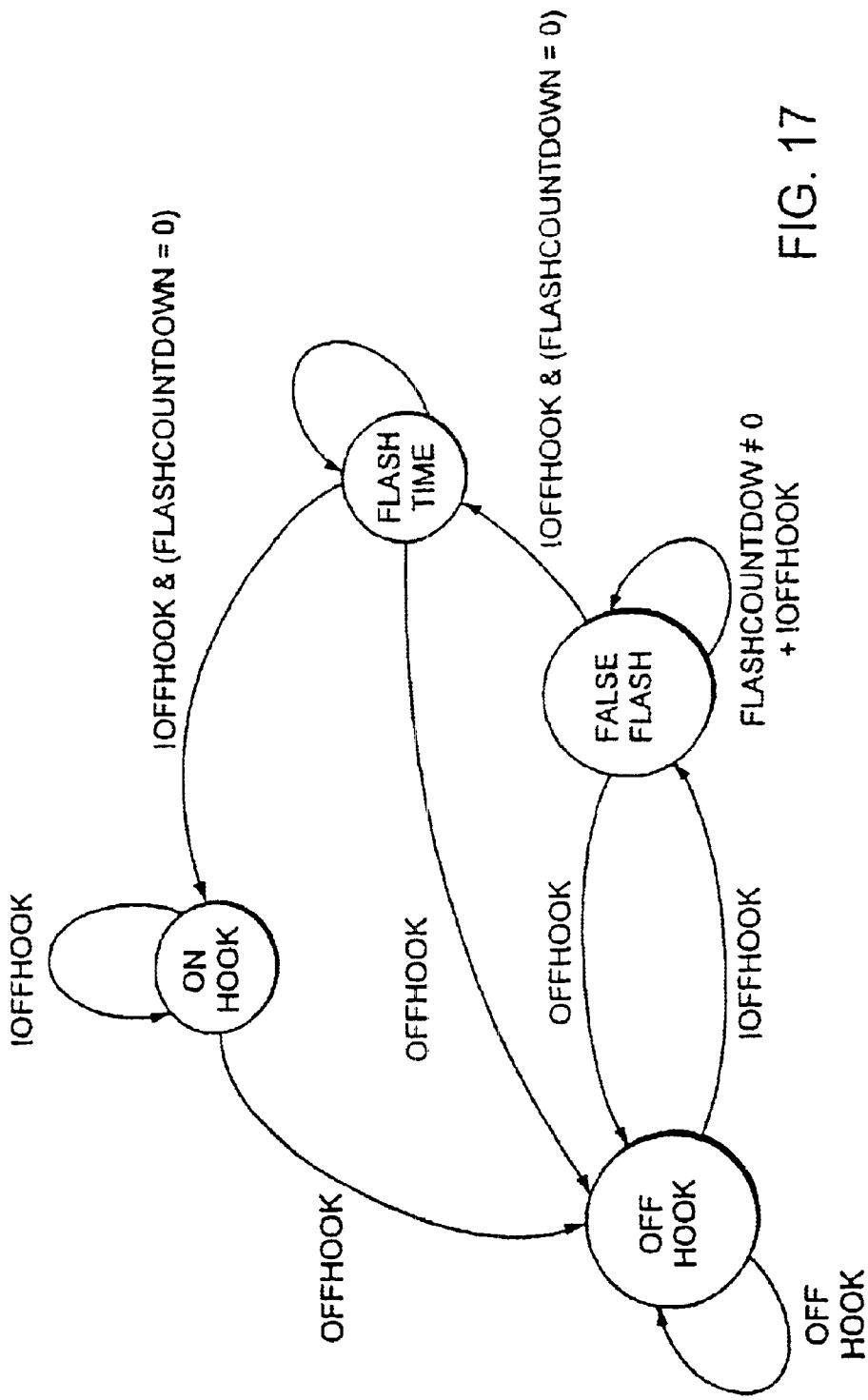

FIGS. 15, 16, and 17 show the PotsRingCheck, HWRingCheck, and OffHookCheck routines, respectively, in greater detail.

Referring to FIG. 15, the PotsRingCheck routine includes a state machine which starts in a RingIdle state, where it remains while a bit RINGING is cleared low. The RINGING bit corresponds to the RINGDET bit of the status register 352 in the microcontroller 340. If the PotsRingCheck determines that the RINGING bit is true, the PotsRingCheck routine transitions to the FalseFilter state to ensure that a false ring was not detected due to transient noise on the telephone line 130. The PotsRingCheck routine waits in the FalseFilter state while a count variable, RingCountDown, decrements from an initial debounce value (for example, 500 ms). If the RINGING bit is cleared before the RingCountDown reaches zero, then a false ring was received and the PotsRingCheck routine transitions back to the RingIdle state. Thus, effectively, the PotsRingCheck routine debounces an incoming ring signal to ensure that only a true ring is forwarded to the HW_TSP_IFC object 434.

If RingCountDown decrements to zero, and the RINGING bit is still true, the PotsRingCheck routine checks to determine if the HW_DEVICE state machine is in the Listening state, and if true, a method LetPotsRingThrough its invoked to set the value of the Homewires ring counter 354 in the microcontroller 340 to 1 to allow all incoming rings to ring through. The routine also posts a PotsRing event to the call-back window for later processing by the HW_TSP_IFC object 434. The PotsRingCheck routine then transitions to the PotsRinging state.

In the PotsRinging state, the PotsRingCheck routine loads the count variable, RingCountDown, with a time-out value (corresponding to for example, 8 seconds), which is the time-out period within which the next ring must arrive. If the bit RINGING is not asserted again and the RingCountDown variable counts down to zero, then the call was missed (for example, the external caller hung up). The PotsRingCheck routine posts a PotsCallMissed event to the call-back window and transitions back to the RingIdle state. However, if the RINGING bit is asserted again within the time-out period, the PotsRingCheck routine remains in the PotsRinging state.

Referring to FIG. 16, the HWRingCheck routine includes a state machine which starts in the HWRingIdle state, where it waits for the assertion of a bit HWRinging. The bit HWRinging corresponds to the CXD_signal from the microcontroller 340, and it is maintained high if the CIU firmware detects a PIU carrier. If an active HWRinging bit is received, the HWRingCheck routine initializes a variable, PeriodCountDown, to an initial value (corresponding to, for example, 500 ms) and transitions to the HWFalseFilter state to ensure that a false carrier was not detected. In state HWFalseFilter, the variable, PeriodCountDown, is decremented. If a false carrier was detected, that is, the bit HWRinging goes away before the variable PeriodCountDown decrements to zero, the HWRingCheck routine transitions back to the HWRingIdle state. However, if the bit HWRinging remains active and the variable PeriodCountDown decrements to zero (indicating that 500 ms has passed), then a true carrier detect has been received, and the HWRingCheck routine posts a HWRing event to the call-back window for later processing by the HW_TSP_IFC object 434, resets the variable PeriodCountDown to a ring period value (corresponding to, for example, 4 seconds), and transitions to the HWRinging state. One objective of the HW_DEVICE object 436 is to present a Homewires ringing signal to the HW_TSP_IFC object 434 even though the carrier detect bit HWRing is steadily high. Thus, the HWRing event is posted to the call-back window for processing by the HW_TSP_IFC object 434 once every ring period (which is set at about 4 seconds) while the bit HWRinging is high.

In the HWRinging state, if the bit HWRinging is true and the HW_DEVICE state machine is in the OurHomewireCall state (indicating that the Homewires call has been picked up by the HW_TSP_IFC object 434), the HWRingCheck routine transitions to the WaitForHangup state to wait for the current Homewires call to end. The routine remains in the WaitForHangUp state until the bit HWRinging is deasserted, whereupon the routine reloads the count variable PeriodCountDown with a debounce value (corresponding to, for example, 500 ms) and transitions to the FalseHangUp state. This ensures that a false hang-up was not detected due to RF noise. In the FalseHangUp state, if the HWRingCheck routine detects that the bit HWRinging is high again before the variable, PeriodCountDown, counts to zero, it returns to the WaitForHangUp state. Otherwise, if the bit HWRinging is deasserted and the variable PeriodCountDown counts to zero, the HWRingCheck routine posts an HWRemoteDisconnect event and returns to HWRingIdle state.

In the HWRinging state, if the bit HWRinging is asserted but the HW_DEVICE state machine is not in the OurHomewireCall state, the HWRingCheck routine decrements the variable PeriodCountDown, issues a Hw king event when the variable counts down to zero, resets the variable to the ring period value, decrements the variable again, and so forth, until the bit HWRinging is deactivated. This simulates the behavior of a telephone ringing signal even though the carrier detect signal CXD_is maintained high. When the bit HWRinging is deactivated before the HW_DEVICE state machine could reach the OurHomewiresCall state, the HWRingCheck routine posts an HWCallMissed event to the HW_TSP_IFC object 434 to indicate a call has been missed and returns to the HWRingIdle state.

Referring to FIG. 17, the OffHookCheck routine includes a state machine which begins in the OnHook state where it remains while the a bit OffHook remains deasserted. The bit OffHook corresponds to the signal OFFHOOK in the CIU 102. If the bit OffHook is asserted, the OffHookCheck routine posts an OffHook event and transitions to the OffHook state. The OffHookCheck routine remains in the OffHook state while the bit OffHook is asserted high. In the OffHook state, a count variable, FlashCountDown, is set to a false-flash period (for example, 250 ms). When the bit OffHook is negated low, the OffHookCheck routine transitions to the FalseFlash state to ensure that a false flashhook was not detected, that is, the flash was detected for less than the false-flash period. If the bit OffHook is set high before the variable FlashCountDown decrements to zero, the OffHookCheck routine transitions back to the OffHook state. If the variable FlashCountDown reaches zero and the bit OffHook remains low, then the routine transitions to the FlashTime state and the variable, FlashCountDown, is set to a flash period (for example, one second) for determining if a flash-hook was received. In the FlashTime state, the count variable, FlashCountDown, is decremented while the bit OffHook remains low. If the variable FlashCountDown counts down to zero, then the telephone has really been placed back on hook and the OffHookCheck routine posts an OnHook event to the call-back window for processing by the HW_TSP_IFC object 434 and transitions back to the OnHook state. However, if the bit OffHook is set high again before expiration of FlashCountDown, the OffHookCheck routine transitions back to the OffHook state and posts a Flash Detect event to the HW_TSP_IFC object 434.

VIRTUAL DEVICE DRIVER

The async VxD 428 provides a low overhead packet protocol interface to the standard Windows® VCOMM import services. The async VxD 428 performs the following functions: sets up buffering for calls to the port; provides command and control for wave input/output; breaks the information stream into a command stream and data stream; and handles all VCOMM interrupts. The async VxD 428 provides the direct hardware interface to the CIU 102 and notifies the TSP 426 about hardware status change events.

Figure 18A:
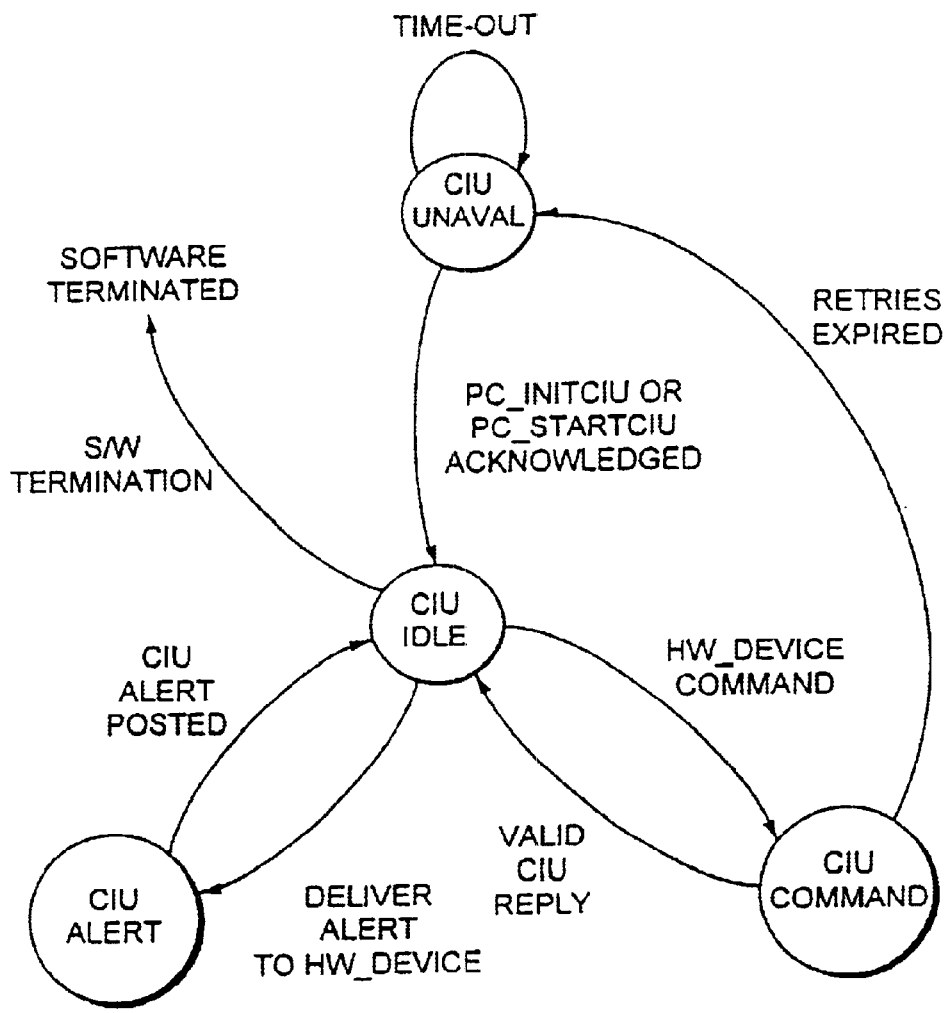
FIG. 18A is a state diagram of a state machine in an asynchronous virtual device driver which is the interface between the computer interface unit of FIG. 6 and the device object of FIG. 12.

Referring to FIG. 18A, the async VxD 428 includes a state machine that initializes in the CIU_UNAVAIL state, in which the async VxD 428 issues a PC_InitCIU or PC_StartCIU method to the CIU firmware to establish a connection. The PC_InitCIU method is issued when the async VxD 428 is initially powered up. The PC_StartCIU method is issued while the async VxD 428 is otherwise active but needs to establish a communications link with the CIU 102 (such as after it had previously shut down the link).

After the PC InitCIU or PC StartCIU method is transmitted, the async VxD 428 expects to receive a response from the CIU 102 within a time-out period (for example, 1500 ms). If the time-out expires, the async VxD 428 remains in the CIU_UNAVAIL state. However, if the CIU firmware responds with its CIU status message, then the async VxD 428 transitions to the CIU_Idle state.

From the CIU_Idle state, the async VxD 428 transitions to the CIU Command state if it receives a command from the HW_DEVICE object 436. In state CIU Command, the HW_DEVICE command is translated to an async VxD command (FIG. 9A) and issued to the CIU 102. Upon transmission of the command, a retry timer is started. After a time-out period (for example, 1500 ms) without a response from the CIU 102, the async VxD 428 will re-issue the command and the retry timer is incremented. After a certain number of retries (for example, 5 retries), the -async VxD 428 will conclude that the connection to the CIU 102 has somehow been lost and return to the CUI_UNAVAIL state. If a valid reply is received from the CIU 102, then the async VxD 428 transitions back to the CIU Idle state.

A state change in the CIU 102 (for example, carrier detected, off-hook detected, line seized, ring detected) will cause the CIU firmware to send an alert to the computer system 100. If the async VxD 428 receives the alert, it transitions to the CIU Alert state, in which the VxD 428 posts an alert event to the call-back window. After the event is posted, the async VxD 428 returns to the CIU_Idle state. To report the alert to the TSP 426, the async VxD 428 posts a Windows message to notify the VxD interface DLL 438 that status has changed. The call-back routine is a memory resident routine which cannot call any Windows functions except PostMessage.

Finally, if the async VxD 428 receives the Software_Termination message from the operating system to shut it down, the async VxD 428 issues a PC_GoInactive command to the CIU 102 to shut the CIU 102 down.

Referring to FIG. 18B, the async VxD 428 maps methods from the HW_DEVICE object 436 to control commands to the CIU firmware. The method RINGPIU is mapped to the command PC_RingPIU to ring PIUs. The method AnswerPots is mapped to the command PC_SeizeLine for the CIU 102 to seize the line 130. The method HangUpPots maps to the command PC_UnseizeLine for the CIU 102 to release the line 130. The method AnswerHomewire maps to the command PC_HWCallAck, which informs the CIU firmware that the TSP 426 has accepted the Homewires call. The method HangUpHomewire maps to the command PC_DropCIUCarrier, which causes the CIU 102 to turn off the CIU carrier. The method Listen maps to the command PC_SetMonitorMode(on), which informs the CIU 102 that it should inform the computer system 100A of status changes. The method EndListen maps to the command PC_SetMonitorMode(off), which informs the CIU 102 not to alert the computer system 100A about status changes as the TSP 426 is no longer monitoring for status changes. The method ReadRingCount maps to the command PC_GetRingRollover to retrieve the current value of the Homewires ring counter 354 in the microcontroller 340. The method SetRingCount maps to the command PC_SetRingRollover to set the initial value of the Homewires ring counter 354.

The async VxD 428 expects the CIU 102 to return an acknowledge message if the command was successfully received. For all the commands except PC_GetRingRollover, the expected message is the status packet CIU_Status from the status register 352 in the microcontroller 340. For the command PC_GetRingRollover, the expected message is the current value of the Homewires ring counter 354.

Referring to FIG. 18C, messages passed from the CIU 102 to the async VxD 102 are mapped as notification events from the HW_DEVICE object 436 to the TSP 426. If the CIU_Status message reports a status change of PIU carrier detected (that is, the CXD_bit is set low), then the HW_DEVICE object 436 posts a HWRing event to the HW_TSP_IFC object 434 when it becomes aware of the status. Similarly, a status change to no PIU carrier detected causes one of the events HWCallMissed, HWRemoteDisconnect, or FlashDetect to be posted by the HW_DEVICE object 436. A status change to off-hook detected causes the event PotsOffHookDetect to be posted. A status change of no off-hook detected causes both events PotsOnHookDetect and HWRemoteDisconnect to be posted. The alert message CIU_Alert_Info(ring available) indicates a ring has been received and causes the async VxD 428 to issue a PC_ClearRingTrigger (resetting the failsafe ring counter 356) to acknowledge receipt of the alert. This alert is forwarded to the HW_DEVICE object 436, which responds by posting the PotsRing event to the HW_TSP_IFC 434. The alert message CIU_Alert_Info(status changed ) indicates that the status has changed and triggers the async VxD 428 to issue the command PC_Get_Status to retrieve the status message CIU_Status.

TSP INTERFACE OBJECT

The HW_TSP IFC object 434 includes a Homewires control state machine for handling Homewires calls and a POTS control state machine for handling POTS calls. The HW_TSP_IFC object 434 receives TAPI commands from the TAPI.DLL 430, which issues the commands in response to commands from the data flow manager 420 that is monitoring the communications line. Effectively, the HW_TSP_IFC object 434 can be thought of as providing two TAPI lines: a Homewires line and a POTS line. The two TAPI lines are monitored by the data flow manager 420.

Alternatively, three TAPI lines can be provided: a Homewires line, a POTS line, and an Internet line. This would allow the computer system 100 to process all three calls simultaneously.

Figure 19A:
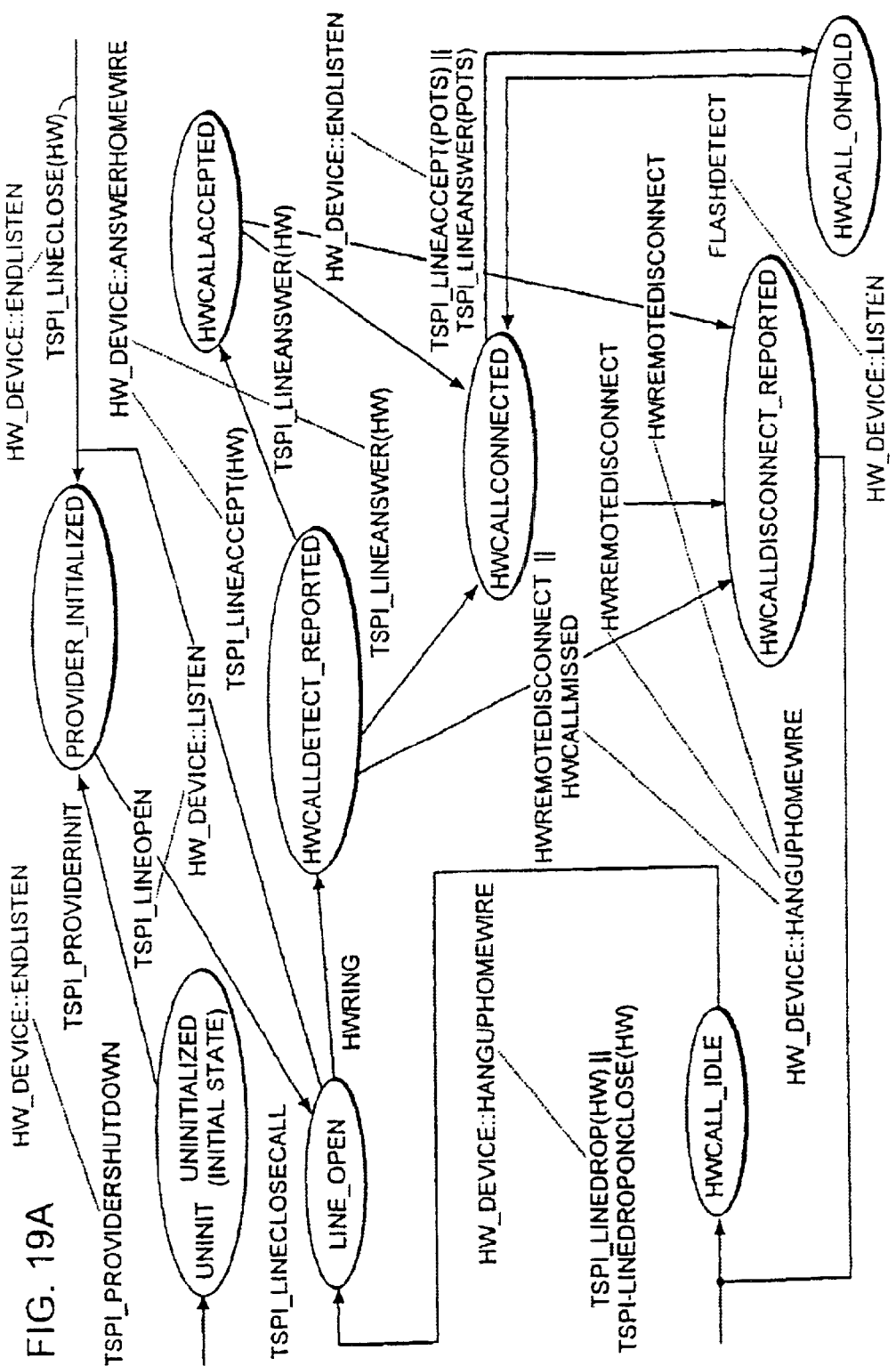
FIGS. 19A–19C are state diagrams of state machines in a TAPI service provider object of the TAPI service provider of FIG. 11.

Referring to FIG. 19A, the Homewires control state machine powers up in the initial state UNINIT. A shutdown method TSPI_ProviderShutdown from the TAPI.DLL 430 causes the Homewires control state machine (HW control state machine) to issue the EndListen method to the HW_DEVICE object 436 and to transition to the UNINIT state.

When the TAPI.DLL 430 is initiated, it issues a method TSPI_ProviderInit, which causes the HW control state machine to issue the method Listen to the HW_DEVICE object and to transition to the Provider_Initialized state. Additionally, receipt of a method TSPI_LineClose(HW) also causes the HW control state machine to transition to the ProviderInitialized state. Typically, the command TSPI_LineClose(HW) is issued while the HW control state machine is in the Lineopen state in response to the ENDLISTEN method.

The method TSPI_LineClose(HW) indicates that the speech recognizer program 408 currently monitoring the Homewires TAPI line wants to shut down the communication line and stop monitoring the line. The HW_TSP_IFC object 434 then issues the method Endlisten to notify the CIU firmware that the TSP 426 has stopped monitoring the line and need not be alerted about status changes.

If a TSPI_LineOpen(HW) method is received, the HW control state machine transitions to the LineOpen state and issues the Listen method to the HW_DEVICE object 436. The data flow manager 420 issues the TSPI LineOpen method if it wants to start monitoring the Homewires line. In the LineOpen state, the HW state machine waits for a HWRing event.

In the LineOpen state, if an HWRing event is detected from the HW_DEVICE object 436 (that is, the user has picked up a PIU-connected telephone), the HW control state machine transitions to the HWCallDetectReported state. In this state, the HW control state machine waits for the data flow manager 420 to determine whether to accept the Homewires call. If the Homewires call is accepted but the appropriate speech control script has not been invoked yet by the command management program 410, the data flow manager 420 issues the TSPI_LineAccept method, causing the HW control state machine to transition to the HWCallAccepted state to wait for the appropriate speech control script to begin operation. The method AnswerHomewire is issued by the HW control state machine to the HW_DEVICE object to answer the Homewires call.

When the speech control script is ready, the data flow manager 420 issues the TSPI_LineAnswer command, and the HW control state machine transitions to the HWCallConnected state from either state HWCallDetectReported or HWCallAccepted. In the HWCallConnected state, a speech control script in the command management program 410 (through the data flow manager 420) communicates with the user on a PIU-connected telephone through the MMSYSTEM.DLL 423 and the wave driver 424.

The TAPI HWRemoteDisconnect event is transmitted to the HW_TSP_IFC object 434 in response to the user hanging up while a Homewires call (from a PIUconnected telephone) is in progress. The HWRemoteDisconnect event is also transmitted if a non-PIU phone is lifted, which causes the CIU 102 to shut off its CIU carrier. If the HW control state machine receives the HWRemoteDisconnect event from the HW_DEVICE object, it transitions to the HWCallDisconnectReported state from the HWCallDetectReported, HWCallAccepted, or HWCallConnected state. This causes the method HangUpHomewire to be issued to the HW_DEVICE object. In addition, from the HWCallDetectReported state, receipt of the event HWCallMissed from the HW_DEVICE object will cause the HW control state machine to transition to the HWCallDisconnectReported state, which indicates that even though the HWRing event was received, the PIU-connected telephone has hung up. In response to the HWRemoteDisconnect event, the data flow manager 420 issues a LineDrop(HW) method to drop the Homewires line. The HW control state machine then transitions to the HWCallIdle state.

A LineDropOnClose(HW) method can also be issued by the data flow manager 420 (for example, in response to a user-entered command from the keyboard, mouse or other user interface) to drop the Homewires line (if active). The LineDropOnClose(HW) method also causes the HW control state machine to transition to the HWCallIdle state from any other state.

In transitioning to the HWCallIdle state, the HangUpHomewire method is issued to the HW_DEVICE object 436. From the HWCallIdle state, the HW control state machine transitions to the LineOpen state if the TAPI.DLL 430 issues the TSPI LineCloseCall(HW) command to close a current Homewires call session, that is, data structures allocated to the call are deallocated from memory.

If an incoming POTS call is detected while a Homewires call is in progress (that is, the system is in the HWCallConnected state), a user on a PIU-connected phone can instruct the communication software that the user wants to answer the call or have the communication software answer the call by voice-mail. In response the TAPI.DLL 430 issues a TSPI_LineAccept(POTS) or a TSPI_LineAnswer(POTS) to allow the communication software to answer the incoming call. The HW control state machine then transitions to the HWCallOnHold state and issues the Endlisten method to the HW_DEVICE object 436 to shut off the CIU carrier, thereby allowing the PIUs to connect their respective telephones to the telephone line 130 for POTS calls. The HW_TSP_IFC object 434 also posts a TAPI OnHold message to the data flow manager 420 when it enters the HWCallOnHold state. The HW state machine remains in the HWCallOnHold state until it detects a FlashDetect event (the user wants to go back to the Homewires call). In response to the Flash Detect event, HW state machine issues the Listen method to re-enable the CIU carrier, which effectively returns the line to the Homewires call that was placed on hold. The HW state machine then transitions back to the HWCallConnected state.

Figure 19B:
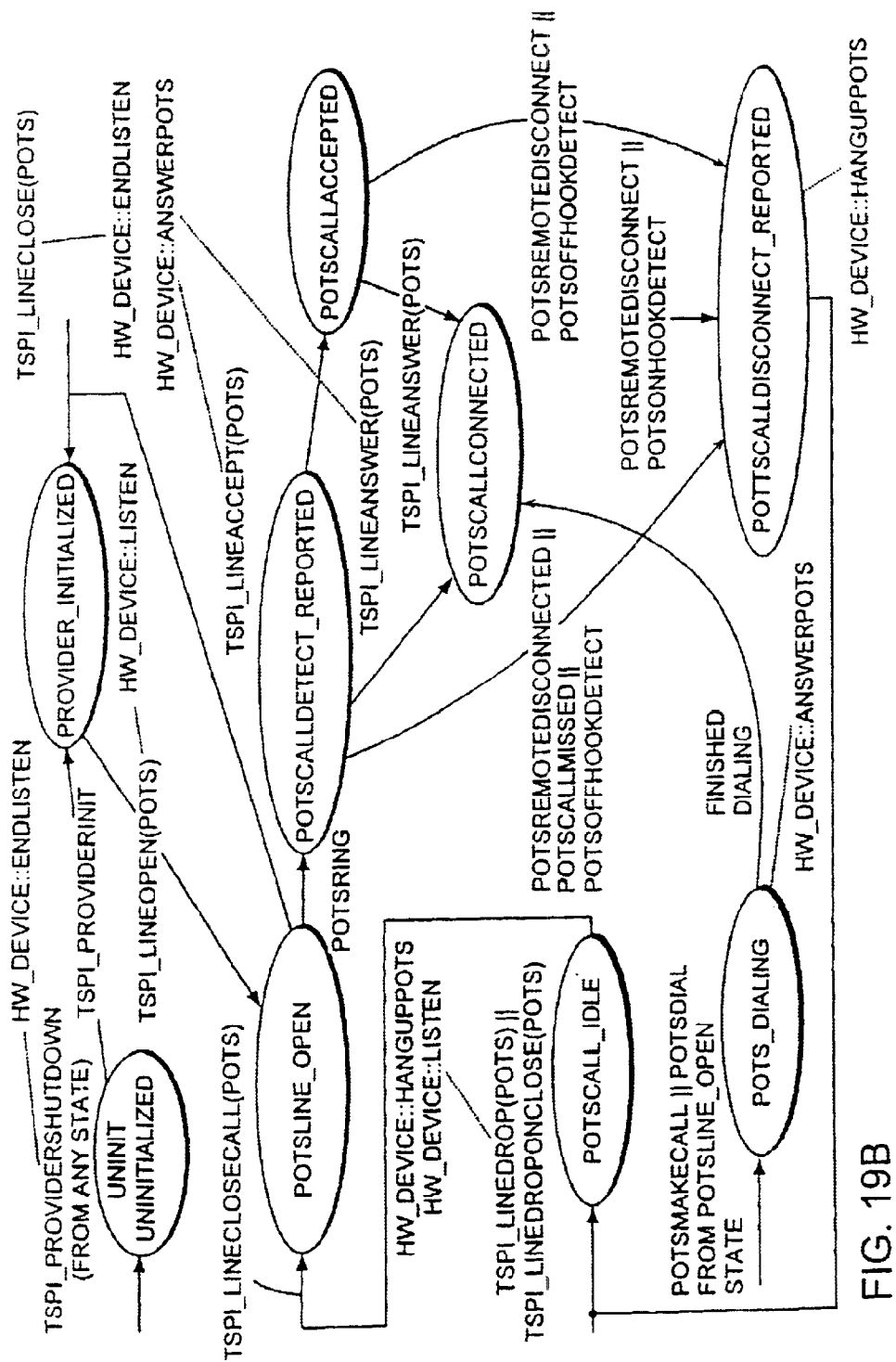

Referring to FIG. 19B, the POTS control state machine of the HW_TSP_IFC object 434 starts in state UNINIT after power-up or transitions to the state in response to the TSPI_ProviderShutdown command. Upon receipt of the TSPI_ProviderInit command, the POTS control state machine transitions to the ProviderInitialized state. Receipt of a method TSPI_LineClose(POTS) also causes the POTS control state machine to transition to the ProviderInitialized state. Typically, the TSPI_LineClose(POTS) method is issued when the POTS control state machine is in a PotsLineOpen state.

The method TSPI LineClose(POTS) indicates that the data flow manager 420 currently monitoring the POTS TAPI line wants to stop monitoring the line. The HW_TSP_IFC object 434 then issues the method Endlisten to notify the CIU firmware that the TSP 426 has stopped monitoring the line and need not be alerted about status changes.

If a TSPI LineOpen(POTS) method is received, the POTS control state machine transitions to the PotsLineOpen state and issues the Listen method to the HW_DEVICE object 436. The data flow manager 420 issues the TSPI_LineOpen (POTS) method if it wants to start the monitoring the POTS line. In the PotsLineOpen state, the TSP 426 waits for a PotsRing event.

In the PotsLineOpen state, if a user issues a command (from a PIU-connected telephone) during a Homewires call to the command management program 410 to dial an external number, the command management program 410 causes the data flow manager 420 to issue a command PotsMake-Call (to enable the DTMF generator to make a call), which causes the POTS control state machine to issue the Answer-Pots command (to notify the CIU firmware to seize the line 130) and to transition from the PotsLineOpen state to the PotsDialing state. Following the PotsMakeCall method, the data flow manager 420 next issues a PotsDial method to start the DTMF generator dialing a number. After the DTMF generator has finished dialing, the POTS control state machine transitions to the PotsCallConnected state.

In the PotsLineOpen state, if a PotsRing event is detected from the HW_DEVICE object 436 (that is, an incoming call is present), the POTS control state machine transitions to the PotsCallDetectReported state. In the transition, if the HW control state machine is not in the HWCallConnected state, then the POTS control state machine issues the EndListen method to the HW_DEVICE object 436 to stop monitoring for a Homewires call.

In the PotsCallDetectReported state, the POTS control state machine waits for the data flow manager 420 to determine whether to accept the POTS call. If the external user hangs up, and the ring goes away, then the event PotsCallMissed is posted by the HW_DEVICE object, causing the HW control state machine to transition to the PotsCallDisconnectReported state. If the POTS call is accepted but the appropriate speech control script has not been invoked yet, the data flow manager 420 issues the TSPI_LineAccept(POTS) command and the POTS control state machine transitions to the PotsCallAccepted state to wait for the appropriate speech control script to begin operation. The method AnswerPots is issued by the POTS control state machine to the HW_DEVICE object to answer the POTS call.

When the speech control script is ready, the data flow manager 420 issues the TSPI_LineAnswer(POTS) command, and the POTS control state machine transitions to the PotsCallConnected state from either of states PotsCall-DetectReported or PotsCallAccepted. In the PotsCallConnected state, a speech control script in the command management program 410 communicates with the external caller through the data flow manager 420. If, however, a user answers the call by picking up a telephone on the telephone line 130, then a PotsOffHookDetect is transmitted to the POTS control state machine, which transitions directly to the PotsCallDisconnectReported state directly from either the PotsCallDetectReported or the PotsCallAccepted state. (This allows the computer to hang up the call while the user stays on the line).

The TAPI PotsRemoteDisconnect event is transmitted to the HW_TSP_IFC object 434 in response to the external user hanging up during the POTS call and the CIU firmware detecting a dial tone. If the POTS control state machine receives the PotsRemoteDisconnect event from the HW_DEVICE object 436, it transitions to the PotsCallDisconnectReported state from the PotsCallDetectReported, PotsCallAccepted, or HWCallConnected state. This causes the method HangUpPots to be issued to the HW_DEVICE object to hang up the POTS call. In response to the PotsRemoteDisconnect event, the data flow manager 420 issues a LineDrop(POTS) method to drop the POTS line. In response to the LineDrop(POTS) method, the POTS control state machine transitions to the PotsCallIdle state from the PotsCallDisconnectReported state.

A LineDropOnClose(POTS) method can also be issued by the data flow manager (for example, in response to a user-entered command from the keyboard, mouse, or other user interface) to drop the POTS line (if active), which causes the Pots control state machine to transition to the PotsCallIdle state from any state.

In the transition to the PotsCallIdle state, the POTS control state machine issues the HangUpPots method to the HW_DEVICE object 436. From the PotsCallIdle state, the POTS control state machine transitions to the PotsLineOpen state if the data flow manager 420 issues the TSPI_LineCloseCall(POTS) method to close a current POTS call. The POTS control state machine also issues the Listen method to the HW_DEVICE object 436 to begin monitoring the line again.

Figure 19C:
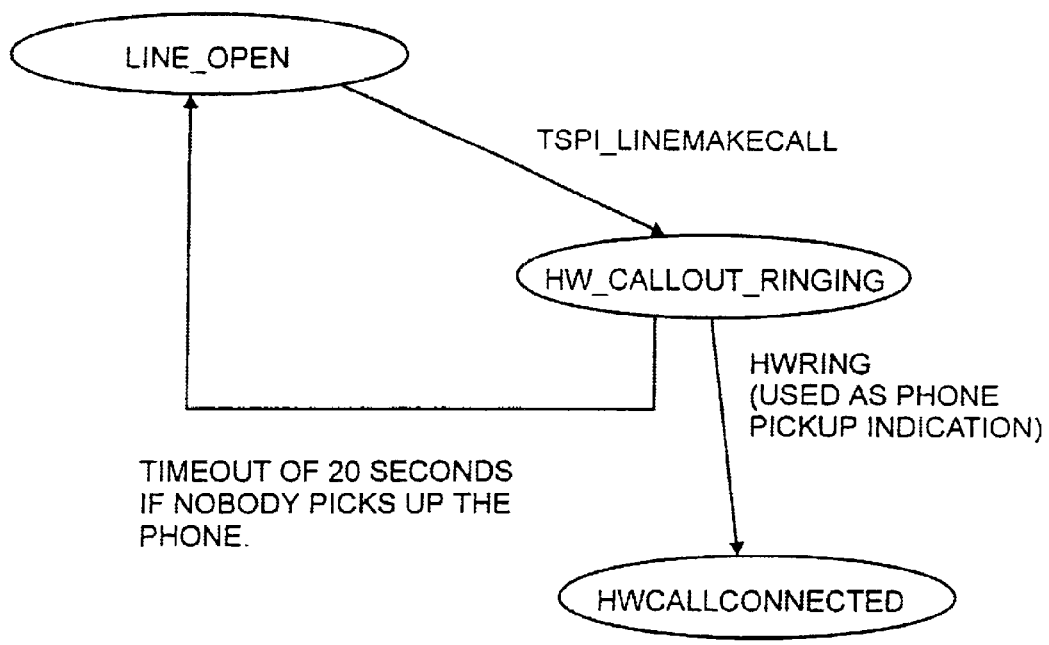

Referring to FIG. 19C, the manner in which the TSP 426 can notify a local user of an incoming network phone call (when the local user is not already on a Homewires call) is described. To notify a user, the Homewires application 58 issues a phone call to PIU-connected telephones. In one embodiment, ringers in the PIU can be rung. Starting at the LineOpen state in the HW_TSP_IFC object 434 (FIG. 19A), receipt of a command TSPI_LineMakeCall causes the state machine to transition to the HW_CallOut_Ringing state. In this state, the HW_TSP_IFC object 434 issues a command to the lower levels of the communication program and the CIU 102 to issue a ring command to the PIUs, which causes ringers in the PIUs to ring. If no answer occurs within a predetermined time (e.g., 20 seconds), the HW_TSP_IFC object 434 returns to the LineOpen state. However, if a PIU-connected telephone is picked up, as indicated by the HWRing command, the HW_TSP_IFC object 434 transitions to the HWCallConnected state (FIG. 19A), where a Homewires call can proceed.

When a PIU user hangs up (local hang-up), the TAPI.DLL 430 issues a TAPI HWRemoteDisconnect event (FIG. 19A) to the HW_TSP_IFC object 434. The HW_TSP_IFC object 434 then enters its HWCallIdle state (FIG. 19A), at which point the TSP 426 issues a Line_CallStateIdle message that is passed up to the network phone call setup and control component 62.

As described above, the TAPI_LineDeallocateCall event is sent by the network phone call setup and control component 62 in response to detection of the Line_CallStateIdle message. The TAPI_LineDeallocateCall event received by the TSP 426 is transformed by the TAPI.DLL 430 to a TSPI_LineCloseCall(HW) command sent to the HW_TSP_IFC object 434 to close a current Homewires call session.

The audio and video conferencing protocol, e.g., the H.323 standard, used by the network phone call control component 64 provides the mechanism for establishing and controlling network phone calls and for communicating voice, video, and data in both point-to-point and multi-point conferences. If the H.323 protocol is used, then the Homewires phone becomes a voice only terminal (although the computer 100 itself could participate in both video and data conferencing components of a call).

In the H.323 scheme, the network phone application 56 is a "glue layer" that establishes the call on behalf of the Homewires user with a Q.931 call setup and H.245 conference management over a standard TCP connection. Once the call is established, digitized audio wave data is passed between the Homewires audio wave driver 424 and the H.323 audio codec 66 (e.g., the G.723 audio codec, which works over low-bandwidth audio connections that do not guarantee quality of service). The audio codec 66 will operate over a standard UDP connection as specified in the H.323 standard.

The requirement of a real time interactive voice between two or more parties in a network phone call places a serious time constraint on the entire voice data pipeline, illustrated in FIG. 20. Typical speech recognition applications use a buffer of 2048 bytes (about a ¼ second delay) of a voice for each processing cycle. In the speech recognition context, the user is typically responding to a prompt from the computer, and the computer's typical one-second response meets the user's expectations.

On the other hand, the network phone call process introduces several delays associated with buffering and processing of digitized voice data. The delays result from several factors, including delays through the VxD driver 428 and audio wave driver 424 in the telephone communication software, the audio codec 66, and the network 12 itself.

The delay can be as much as several seconds. For example, an H.723 codec has about a 58 millisecond total encoding/decoding process cycle time, and the Internet itself runs at about 250 milliseconds in local networks, but can run as much as 4 to 5 seconds when operating over long distances on slow lines. Thus, when a network phone call is established, the VxD driver 428 will switch to much smaller buffers, (e.g., 232-byte buffers). The smaller buffer size allows the audio codec 66 to remain full, having a buffer ready just as it needs one, while introducing the minimal 27.5 millisecond delay.

Other embodiments are also within the scope of the following claims. For example, an operating system other than the Windows® 95 operating system can be used, such as Windows® NT, OS/2, and Unix. The computer interface unit can be built into the computer system and connected to an internal computer bus. The PIUs can be built into telephones. The communication software can run on another computer system connected to the first computer system over a network.

Some embodiments of the invention may have one or more of the following advantages. Multiple telephones can be connected to a computer configured to handle voice communication over a network. The telephones can be located at various points in a home or office, which allows more convenient access without requiring multiple computers. The user can use a familiar interface (a telephone) to perform network voice communications.

Various software or firmware (formed of modules, routines or other layers, for example) may be stored or otherwise tangibly embodied in one or more machine-readable storage media in the telephone system 10. Storage media suitable for tangibly embodying software and firmware instructions may include different forms of memory including semiconductor memory devices such as dynamic or static random access memories, erasable and programmable read-only memories (EPROMS), electrically erasable and programmable read-only memories (EEPROMS), and flash memories; magnetic disks such as fixed, floppy and removable disks; other magnetic media including tape; and optical media such as CD or DVD disks. The instructions stored in the one or more storage media when executed cause the system 10 to perform programmed acts.

The software or firmware can be loaded into the system 10 in one of many different ways. For example, instructions or other code segments stored on one or more storage media or transported through a network interface card, modem, or other interface mechanism may be loaded into the system 10 and executed to perform programmed acts. In the loading or transport process, data signals that are embodied as carrier waves (transmitted over telephone lines, network lines, wireless links, cables and the like) may communicate the instructions or code segments to the system 10.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A computer, comprising:

host logic; and an input device coupled to said host logic;
  wherein said host logic is capable of receiving voice commands from a telephone coupled to said computer; and
  wherein said host logic is capable of detecting when a user takes the telephone off hook and responding by permitting the telephone to be connected to a telephone system; and
  wherein said host logic also is capable of detecting when a user flashes the telephone and responding by disconnecting the telephone from the telephone system and connecting the telephone to the computer.

2. The computer of claim 1 wherein the host logic receives a voice command from the telephone.

3. The computer of claim 2 wherein the host logic interprets said voice command and performs an action in response to said voice command.

4. The computer of claim 3 wherein the voice command includes turning on or off lights controllable by said computer.

5. A method, comprising:

detecting a phone taken off hook;

connecting the phone to a phone system;

detecting a phone flash;

disconnecting the phone from the telephone system;

connecting the phone to a computer;

receiving a voice command from the phone;

interpreting said voice command; and performing an action in response to the voice command.

6. The method of claim 5 wherein said action includes completing a phone call.

7. The method of claim 5 wherein said action includes turning on or off lights controllable by said computer.

* * * * *